US006899743B2

(12) United States Patent
Wijmans et al.

(10) Patent No.: US 6,899,743 B2
(45) Date of Patent: May 31, 2005

(54) SEPARATION OF ORGANIC MIXTURES USING GAS SEPARATION OR PERVAPORATION AND DEPHLEGMATION

(75) Inventors: Johannes G. Wijmans, Menlo Park, CA (US); Richard W. Baker, Palo Alto, CA (US); Anurag P. Mairal, Fremont, CA (US)

(73) Assignee: Membrane Technology and Research, Inc., Menlo Park, CA (US)

( * ) Notice: Subject to any disclaimer, the term of this patent is extended or adjusted under 35 U.S.C. 154(b) by 6 days.

(21) Appl. No.: 10/459,639

(22) Filed: Jun. 11, 2003

(65) Prior Publication Data

US 2003/0233934 A1 Dec. 25, 2003

Related U.S. Application Data

(60) Provisional application No. 60/388,390, filed on Jun. 12, 2002.

(51) Int. Cl.[7] ............................................. B01D 53/22
(52) U.S. Cl. ........................ 95/50; 210/640; 585/818
(58) Field of Search .......................... 95/45, 50; 96/4, 96/7–9; 210/640, 641; 585/818, 819

(56) References Cited

U.S. PATENT DOCUMENTS

| 2,930,754 | A | | 3/1960 | Stuckey | |
|---|---|---|---|---|---|
| 3,966,834 | A | | 6/1976 | Perry et al. | |
| 4,553,983 | A | | 11/1985 | Baker | |
| 4,774,365 | A | | 9/1988 | Chen et al. | |
| 4,857,078 | A | | 8/1989 | Watler | |
| 4,925,562 | A | | 5/1990 | te Hennepe et al. | |
| 4,929,358 | A | | 5/1990 | Koenitzer | |
| 4,952,751 | A | * | 8/1990 | Blume et al. | 585/818 |
| 5,030,356 | A | * | 7/1991 | Blume et al. | 210/640 |
| 5,147,550 | A | * | 9/1992 | Wijmans et al. | 210/640 |
| 5,169,533 | A | * | 12/1992 | Baker et al. | 210/640 |
| 5,256,295 | A | * | 10/1993 | Baker et al. | 210/640 |
| 5,256,296 | A | * | 10/1993 | Baker et al. | 210/640 |
| 5,290,452 | A | | 3/1994 | Schucker | |
| 5,670,051 | A | | 9/1997 | Pinnau et al. | |
| 5,769,926 | A | | 6/1998 | Lokhandwala et al. | |
| 6,271,319 | B1 | | 8/2001 | Baker et al. | |
| 6,755,975 | B2 | * | 6/2004 | Vane et al. | 210/640 |
| 2002/0007732 | A1 | * | 1/2002 | Mohr et al. | 95/45 |
| 2004/0173529 | A1 | * | 9/2004 | Da Costa et al. | 210/640 |

OTHER PUBLICATIONS

Caro, J. et al., "Zeolite membranes—state of their development and perspective," Microporous and Mesoporous Materials 38, 3–24, 2000.

Di Cave, S. et al., "Mathematical Model for Process Design and Simulation of Dephlegmators for Binary Mixtures," Can. J. Chem. Eng. 65, 559–564, Aug. 1987.

Lucadamo, G. et al., "Improved ethylene and LPG recovery through dephlegmator technology," Gas Sep. and Purification, vol. 1, 94–102, Dec. 1997.

Jibb, R. et al., "The Potential for Using Heat Transfer Enhancement in Vent and Reflux Condensers," Cal Galvin Ltd. website at http://www.calgalvin.co.uk/news, no date.

(Continued)

Primary Examiner—Robert H. Spitzer
(74) Attorney, Agent, or Firm—J. Farrant

(57) ABSTRACT

A process for treating mixtures of organic components, including azeotropic mixtures. The process includes a gas- or liquid-phase membrane separation step in conjunction with a dephlegmation step to treat at least a portion of the permeate vapor from the pervaporation step. The process yields a membrane residue stream, a stream enriched in the more volatile component as the overhead stream from the dephlegmator and a condensate stream enriched in the less volatile component as a bottoms stream from the dephlegmator. Any of these may be the principal product of the process.

47 Claims, 20 Drawing Sheets

OTHER PUBLICATIONS

Vane, L. et al.,"Separation of Vapor–Phase Alcohol/Water Mixtures Via Fractional Condensation Using a Pilot–Scale Dephlegmator . . . ," J. Memb. Sci. (in press) 2003.

Wynn, N., "Pervaporation Comes of Age," Chem. Eng. Progress 97, 66–72, Oct. 2001.

Neel, J., "Pervaporation" in Membrane Separation Technology Principles and Applications, R.D. Noble and S.A. Stern, Eds., 143–149, Elsevier, 1995.

* cited by examiner

SEPARATION OF ORGANIC MIXTURES USING GAS SEPARATION OR PERVAPORATION AND DEPHLEGMATION

This application claims the benefit of U.S. Provisional Application Ser. No. 60/388,390, filed Jun. 12, 2002 and incorporated herein by reference.

FIELD OF THE INVENTION

The invention relates principally to the separation of organic mixtures by membrane separation in the gas or liquid phase. The separation is carried out using a hybrid process combining membrane separation with reflux condensation, also known as dephlegmation.

BACKGROUND OF THE INVENTION

Mixtures of organic compounds occur throughout industry, such as in the petrochemical industry, refining industry and elsewhere. Such mixtures include aromatic/aliphatic mixtures, olefin/paraffin mixtures, mixtures containing substituted and unsubstituted hydrocarbons, mixtures containing alcohols, aldehydes, ketones, ethers or esters, mixtures containing fluorocarbons, mixtures containing sulfur-containing compounds, azeotropic mixtures of all kinds, and so on.

Pervaporation is an energy-efficient membrane-separation process that has been used as an alternative to distillation for removal and/or recovery of volatile organic compounds from aqueous solutions and for dehydration of industrial solvents or other organic liquids. The process can provide very selective separation of hydrophobic organic compounds, such as aromatic hydrocarbons or chlorinated solvents, from water, but is much less effective in separating more hydrophilic organics, such as alcohols and ketones, from water, or in separating similar organic compounds from one another.

Refineries and petrochemical plants in the United States use 40,000 distillation columns to separate organic liquid mixtures. These columns account for approximately 3% of total U.S. energy consumption.

In principle, these separations could be performed at a much lower cost and with far less energy consumption by permeation of the liquids or vapors through membranes.

Interest in using pervaporation for separating organic mixtures has waxed and waned over many years. The first systematic studies of pervaporation for separating mixtures of aromatics, or aromatics from aliphatics, were performed by Binning, Lee, Stuckey and others at American Oil in the 1950s. This work is exemplified in U.S. Pat. No. 2,930,754 and other similar patents.

In the 1970's, work on similar separations was carried out by Perry and others at Monsanto. Patents assigned to Monsanto disclose a variety of pervaporation applications. For example, U.S. Pat. No. 3,966,834 concerns separation of dienes from mono-unsaturated compounds.

In the late 1980's and early 1990's, various oil companies—Texaco, Mobil, and particularly Exxon—undertook significant research programs to develop improved membranes and processes for use in aromatic/aliphatic separations. For a few years, Exxon was the most prolific patentee in any membrane-separation-related area on the strength of this effort. Exemplary patents to Schucker and others in this period include U.S. Pat. Nos. 4,929,358 and 5,290,452.

Despite this wealth of research, both in the laboratory and in pilot plants, pervaporation processes that are technically and economically competitive with distillation have not been available to date.

Gas separation by means of membranes has been used for a number of separations involving light organic mixtures, where the organic compounds are gases at ordinary temperatures. Representative organic gas mixtures so treated include natural gas and light petrochemical feedstocks or off gases.

Mixtures of organic compounds in the vapor phase are also found. Vapor separation is a membrane separation process in which a feed stream that is normally liquid under ambient temperature and pressure conditions is supplied to the feed side of the membrane as a vapor. Thus the process is normally performed at elevated temperatures.

A number of patents describe separation of organic gases or vapors by means of membranes. Exemplary patents in this area include U.S. Pat. Nos. 4,553,983; 4,857,078; 5,670,051; 5,769,926 and 6,271,319.

SUMMARY OF THE INVENTION

The invention is a process for separating a mixture of organic compounds, using a combination of membrane separation and reflux condensation, also known as dephlegmation.

The combination membrane separation/dephlegmation process can treat streams containing two or more organic compounds, or groups of compounds, to produce a product stream containing up to 90 wt % or more of one of the organic compounds or groups of compounds. High levels of enrichment can be achieved even when the organic compound(s) to be enriched are present at relatively low concentrations in the feed, such as 5 wt % or less, and when the organic compounds are poorly separated by conventional pervaporation or gas separation.

The process has a number of advantageous features. For example, in a conventional pervaporation process, or in a gas separation process in which the permeate is an organic vapor, the permeate vapor is often fully condensed (except for any inert gases that may be present), so that the purity of the product depends entirely on the separation capability of the membrane separation step. Even if partial condensation is used, the vapor and liquid phases leave the heat exchanger together, at equilibrium, so the separation obtained depends only on the vapor/liquid equilibrium ratio at the condensation conditions.

In contrast, the present invention uses a dephlegmator, from which the condensate leaves at the bottom and the uncondensed vapor leaves at the top. The dephlegmator tubes, fins or packing elements behave as wetted walls in which the up-flowing vapor and down-flowing condensate are in countercurrent contact. This provides a separation improved, for example, four-fold or six-fold compared with that provided by a simple partial condensation.

Further, only the vapor condensing at the top of the column must be cooled to the lowest temperature. In contrast, a conventional condenser requires all of the vapor to be cooled to the same low temperature. Therefore, the cooling load required to operate the process of the invention can be significantly less than that required to operate a conventional partial condenser.

In the aspect in which the membrane separation step is pervaporation, the process of the invention involves running a liquid feedstream, containing at least two organic components, through a membrane pervaporation system.

The pervaporation system may contain one or more membrane modules, of similar or dissimilar type, and may be arranged in any desired configuration, such as one-stage, multistep or multistage, all of which are known in the membrane separation arts. The temperature and/or pressure and/or composition of the streams passing from one step or stage to the next may be adjusted.

The membranes may be of any type capable of operating in pervaporation mode to provide separation between organic components. Suitable membranes include, but are not limited to, polymeric membranes and inorganic membranes.

Transport through the membrane is induced by maintaining the vapor pressure on the permeate side of the membrane lower than the vapor pressure of the feed liquid. This is usually, but not necessarily, achieved by operating at below atmospheric pressure on the permeate side. A partial vacuum on the permeate side of the membrane may be obtained simply by relying on the pressure drop that occurs as a result of the cooling and condensation that takes place in the dephlegmator, or may be augmented by use of a vacuum pump. The vapor pressure of the feed liquid may also be raised by heating the feed solution, and/or a sweep gas on the permeate side may be used.

The pervaporation step produces a permeate vapor, enriched in one or more components of the feed mixture, that forms the feed to the dephlegmator.

In another aspect, other types of membrane separation processes capable of producing a vapor phase organic mixture as feed to the dephlegmation step may be used. Suitable processes include membrane distillation, where the feed to the membrane separation step is in the liquid phase, and gas separation or vapor separation, where the feed to the membrane separation step is in the gas phase.

As with pervaporation, the membrane system may contain any type of membrane capable of carrying out the appropriate separation, and may be configured in any manner.

If the feed to the membrane separation unit is in the gas phase, a driving force for transport through the membrane may optionally be provided by compressing the feed gas. The permeate side of the membrane may then be maintained at atmospheric pressure or above or below atmospheric pressure as convenient. A sweep gas may also be used on the permeate side.

The dephlegmator may be of any type capable of providing counter current contact between upward flowing vapor and downward flowing condensate, and able to provide heat exchange over at least part of the length of the dephlegmator between the feed under treatment and an appropriate coolant. Examples of suitable types of dephlegmator include shell-and-tube and brazed aluminum plate-fin designs, as well as packed columns of various configurations.

The dephlegmation step may be carried out using a single dephlegmator, or may incorporate multiple dephlegmators arranged in series, optionally in such a configuration as to enable multiple products of different compositions to be withdrawn.

The processes of the invention are useful in diverse circumstances. A representative, but non-limiting, application area is the recovery of individual components from azeotropic mixtures. The process may be used, for example, to yield enhanced performance in membrane separation applications, such as those in which the permeate from the membrane separation unit forms a single phase, and/or is not highly enriched in one component, and/or is to be subjected to further treatment, such as distillation.

In some cases, the process of the invention can be used upstream or downstream of a distillation column to unload or simplify the distillation step, or can obviate the need for distillation entirely.

One specific exemplary area in which the process is useful is the separation of aromatic/aliphatic mixtures. This is a much desired and important separation in many refinery and petrochemical applications. Refinery feeds are very complex and may contain several hundred components, so surrogate mixtures are used to model the separation process, for example, toluene from n-octane, benzene from cyclohexane, or para-xylene from n-decane. The typical order of membrane permeabilities is: aromatics>olefins>paraffins.

A process to separate aromatics from other components can be performed in the pervaporation or gas-phase mode. A pervaporation separation may be carried out using, for example, hot (80–150° C.) liquid feed and a permeate pressure of 5–15 psia. As another example, the process can be performed in the vapor phase at, for example, temperatures of 200° C. or more and permeate pressures up to 50 psia.

The pervaporation process often achieves a better separation and can be used with low cost polymeric membranes and modules.

The vapor phase process usually requires more expensive ceramic membranes but has the advantage that the permeate vapor may be collected at a higher pressure. This makes the dephlegmator cheaper and allows the dephlegmator to be operated with higher temperature cooling water.

Another specific exemplary use is to separate azeotropic mixtures containing light alcohols. Methanol and ethanol both form many azeotropes with common organic liquids, particularly esters and ethers. These azeotropes tend to form when alcohols are used as reactants or solvents, for example, during esterification reactions between acids and alcohols. A representative separation of a mixture of this type that may be carried out by our process is methanol from ethyl acetate.

Other representative mixtures in this category arise from gasoline additive production. For example, during production of MTBE or DMC (dimethyl carbonate), it is often required to separate methanol from vapor streams, as described in U.S. Pat. No. 4,774,365.

Another representative separation involving oxygenates is the enrichment of flavor compounds in essential oils, such as fruit oils.

Yet another application area is the separation of light hydrocarbon isomers, such as normal butane from iso-butane, normal butene from iso-butene, or other branched $C_{4-6}$ molecules from mixtures of $C_{4-6}$ branched and linear paraffins. Even if only a modest separation is provided, this can be very useful in the production of high octane gasoline fuels and a variety of petrochemicals. These light isomer separations may be performed with the feed stream in either the gas or liquid phase.

A similar type of application is separation of light mixtures of more and less saturated compounds, such as propylene/propane mixtures.

Other objects and advantages of the invention will be apparent from the description of the invention to those of ordinary skill in the art.

It is to be understood that the above summary and the following detailed description are intended to explain and illustrate the invention without restricting its scope.

DETAILED DESCRIPTION OF THE INVENTION

Figure 1:
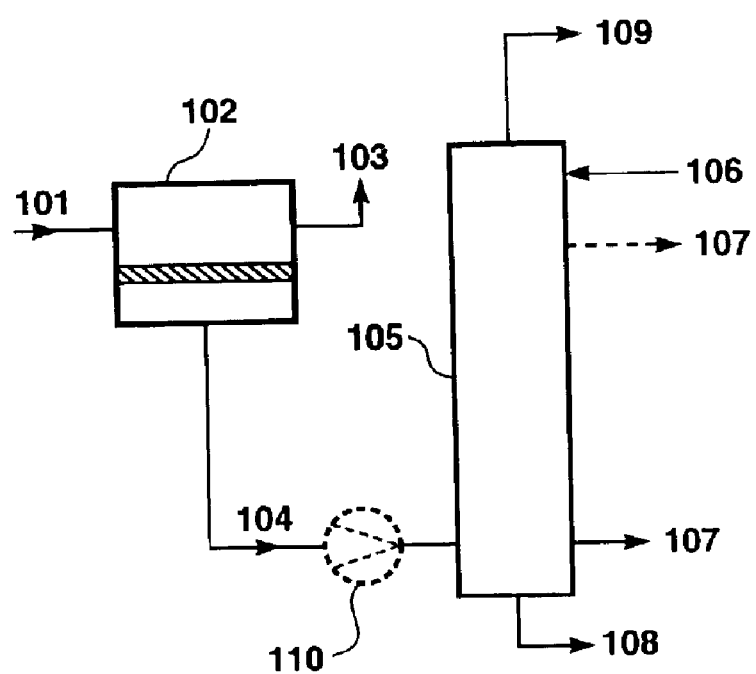
FIG. 1 is a schematic drawing showing a basic embodiment of the invention, optionally including a vacuum pump to reduce pressure on the permeate side.

The terms dephlegmation and reflux condensation have the same meaning herein.

Except where any differences are explicitly described, the terms vapor and gas are used interchangeably herein.

The term fluid as used herein refers to streams in the gas or liquid phase.

The term $C_{4-6}$ hydrocarbon as used herein means a hydrocarbon having four, five or six carbon atoms.

Percentages cited herein are by volume when referring to gases and by weight when referring to liquids, unless stated otherwise.

The invention is a process for treating fluids containing organic compounds. The fluid may be in the gas or the liquid phase.

The scope of the invention is not intended to be limited to any particular streams, but to encompass any situation where a stream containing mixed organic components is found. The streams to which the present invention applies are predominantly composed of organic components; inorganic components, such as water, air or other gases, may be present in minor amounts, by which we mean generally less than about 20 wt %, and more typically, less than about 10 wt % or 5 wt %.

The feed streams that can be treated by the process of the present invention may arise from diverse sources, and include, but are not limited to, process and waste streams from petrochemical processes, refineries, oil and natural gas recovery and processing, chemical manufacturing, pharmaceutical manufacturing, processing of foodstuffs and the like.

The feed streams themselves are also diverse and include, but are not limited to, aromatic/aliphatic mixtures, olefin/paraffin mixtures, mixtures containing substituted and unsubstituted hydrocarbons, mixtures containing alcohols, aldehydes, ketones, ethers or esters, mixtures containing fluorocarbons, mixtures containing sulfur-containing compounds, azeotropic mixtures of all kinds.

Representative organic materials that may be separated from one another by the process of the invention include, but are not limited to, straight-chain, branched, cyclic and aromatic unsubstituted and substituted hydrocarbons, such as propane, propylene, butane, hexane, decane, toluene or cyclohexane, including hydrocarbon mixtures, such as biodiesel, natural gas, LPG, oils, and gasoline; halogenated compounds, such as perchloroethylene or trichloromethane; sulfur-containing compounds, such as thiophenes; esters, such as ethyl acetate or butyl acetate; ethers, such as dimethyl ether or methyl tertiary butyl ether (MTBE); aldehydes and ketones, such as acetone or methyl ethyl ketone; and alcohols, such as methanol, ethanol or isopropanol.

In general, the more hydrophobic of these materials, such as aromatics and chlorinated solvents, may be well separated from the more hydrophilic or polar materials, such as light alcohols, by membrane separation alone. Thus, although the process of the invention can be used satisfactorily to separate such mixtures, it is especially beneficial in treating feed streams that include organics that are only moderately well separated by membrane separation, such as mixtures of isomers, diverse azeotropic mixtures and light olefin/paraffin mixtures.

The invention includes two unit operations—membrane separation and dephlegmation. The membrane separation step is generally performed first, and the membrane permeate is sent to the dephlegmator.

Several membrane separation operations are capable of treating a feed fluid containing organic components to produce a permeate in the form of a vapor comprising an organic mixture of a different composition.

Pervaporation is a low-pressure membrane process that can be used to separate components of differing volatilities from solutions. The overall separation factor achieved is equal to the product of the separation achieved by evaporation of the liquid and the separation achieved by selective permeation through the membrane.

Membrane distillation refers to a separation in which a porous membrane is used to divide the liquid and vapor phases, and the separation obtained is based on the vapor-liquid equilibrium of the components to be separated under the prevailing conditions of temperature and pressure.

Gas separation differs from pervaporation in that there is no evaporative component to the separation factor, since the feed is already in the vapor phase, and in that the process is typically, although not necessarily, performed at a higher feed pressure.

Vapor separation refers to a separation performed in the vapor phase, but where the feed components to be separated are normally liquid at room temperature. In this case, therefore, the feed is typically from a high temperature process, or has been heated prior to the membrane separation step. Examples include feeds of mixed light hydrocarbons, such as $C_4$–$C_6$ hydrocarbons.

Whichever type of separation step is chosen, the membranes for use in the process may be of any kind that results in an overall separation factor in favor of one organic component of the mixture over another component. It is preferable, but not necessary, to use a membrane that will result in an overall separation factor in favor of the minor organic component that it is desired to separate.

A number of membrane types, for example polymeric solution/diffusion membranes, facilitated-transport membranes, ion-exchange membranes and inorganic membranes, can offer gas phase selectivities or pervaporation separation factors in favor of one organic component over another.

Polymeric membranes may be made from rubbery or glassy polymers, and may be more or less hydrophobic depending on the mixture to be treated and the desired permeants.

Candidate rubbery polymers, that is polymers with glass transition temperatures below the normal operating temperature of a pervaporation system, include nitrile rubber, neoprene, polysiloxanes, ethylene- and propylene-based polymers and copolymers, fluoroelastomers, plasticized polyvinylchloride, polyurethane, butadiene-based polymers and copolymers, and block copolymers of polyethers and polyesters.

A highly preferred rubbery polymer membrane material is silicone rubber, which can provide good selectivity in favor of more hydrophobic compounds, such as chlorinated hydrocarbons, over less hydrophobic compounds, such as esters, ketones or alcohols, and that provides good chemical resistance to organic mixtures.

Candidate glassy polymers, that is polymers with glass transition temperatures above the normal operating temperature of a pervaporation system, include polyamides, polyimides, polysulfones, polyvinyl alcohol, polypropylene oxide, cellulose derivatives, polyvinylidene fluoride, and polymers having repeat units of fluorinated dioxoles, fluorinated dioxolanes and fluorinated cyclically polymerizable alkyl ethers.

Highly preferred glassy polymers are those made from fluorinated or perfluorinated polymers, which tend to offer better chemical resistance than other glassy polymers. Particularly preferred glassy polymers are the fluorinated dioxoles, fluorinated dioxolanes and fluorinated cyclically polymerizible alkyl ethers disclosed for use in pervaporation in U.S. pending parent application Ser. No. 10/384,477, now published as U.S. patent application 20040173529, which is incorporated herein by reference.

These polymers combine useful selectivity and good chemical resistance with much higher permeability than is typically provided by other chemically resistant polymers, such as polyimides.

Such materials are available commercially from Asahi Glass Company, of Tokyo, Japan under the trade name Cytop®, and from Solvay Solexis, Thorofare, N.J., under the trade name Hyflon® AD.

These membrane materials are particularly useful for treating mixtures containing light organic components, such as methane, propylene or n-butane, especially light olefin/paraffin mixtures, such as propylene/propane mixtures.

Ion-exchange, or ionic, membranes, contain charged groups attached to the polymer backbone of the membrane material. These fixed charge groups partially or completely exclude ions of the same charge from the membrane. Among the best known ion-exchange membranes are those sold under the name Nafion®. These membranes comprise a polymer of a perfluorosulfonic acid or a derivative thereof.

Such membranes, more commonly used for electrodialysis, have been reported to be useful in the separation of polar compounds, such as alcohols, from more hydrophobic organics.

Facilitated-transport membranes employ a carrier in the membrane that selectively, and reversibly, complexes with one of the components of the feed fluid. Transport across a facilitated-transport membrane takes place by two mechanisms: normal solution/diffusion of uncomplexed molecules, and diffusion of the complexed carrier, the second mechanism occurring only for a species that reacts chemically with the carrier agent. The total transmembrane flux of that species is the sum of the carrier-species complex flux and the uncomplexed species flux.

In the present context, facilitated-transport membranes typically contain carriers that form complexes with unsaturated compounds and are particularly useful for separating olefin/paraffin mixtures.

Facilitated-transport membranes may take a variety of forms, including immobilized liquid membranes (ILMs) and solid dispersions of carrier salts in a polymer matrix. Preferred facilitated-transport membranes for use in the present process are the solid polymer electrolyte membranes taught in U.S. Pat. No. 5,670,051.

Inorganic membranes are usually formed from amorphous silica, zeolites or like materials, and may exhibit more hydrophobic or more hydrophilic behavior depending on the specific zeolite or other material used to make them. Such membranes are described, for example, in J. Caro et al., "Zeolite membranes—state of their development and perspective", *Microporous and Mesoporous Materials*, Vol. 38, 3–24, 2000.

Inorganic membranes are frequently offered in tubular form and may be purchased from various sources, including Mitsui and Company (USA) of New York, Isotronics of Paradise Valley, Ariz., Sulzer Chemtech Membrane Systems, based in Heinitz, Germany, and Pervatech BV of Enter, Netherlands.

Inorganic membranes are particularly valuable in the present context for treating feed streams at high temperature.

Yet another type of membrane suitable for gas separation or pervaporation use is a polymeric membrane impregnated with small hydrophobic zeolite particles, such as silicalite particles. Such membranes are described in U.S. Pat. No. 4,925,562, assigned to GFT Gesellschaft fur Trenntechnik GmbH, and are now offered commercially by Sulzer Chemtech, of Winterthur, Switzerland.

The membrane may take the form of a homogeneous membrane, an asymmetric membrane, a multilayer composite membrane, a matrix incorporating a gel or liquid layer, or any other form known in the art. If the membranes are polymeric membranes, a particularly preferred form is a composite membrane, comprising at least a microporous, relatively unselective support layer and a thin selective coating layer, and optionally other layers, such as a backing, a gutter layer, and a sealing or protective top layer. The making of such membranes is well known in the art.

The membranes may be formed as flat sheets, hollow fibers, tubular membranes or any other convenient form, and housed in any appropriate cartridge or module configuration, such as a spiral-wound module, a plate-and-frame module or a potted hollow-fiber cartridge. In a preferred embodiment for polymeric membranes, the membranes are cast and coated as flat sheets, and then rolled into spiral-wound modules. The preparation of spiral-wound modules is well known in the art. A preferred form for inorganic membranes is a ceramic tubular module, as is well known in the art.

The membrane separation unit can include a single membrane module or a bank or array of multiple membrane modules. A single bank of membrane modules may be adequate to meet the processing requirements for many applications. If additional processing is desirable, an array of modules in a multistep or multistage configuration, optionally with recycle of intermediate streams, as is known in the art, may be used.

For example, if the residue stream requires further purification, it may be passed to a second bank of membrane modules for a second processing step. Such an arrangement may be useful if the feed stream contains a relatively high concentration of one component and the residue stream must be reduced to a very low level of that component.

Such an arrangement may also be helpful in maintaining driving force for transmembrane permeation. The evaporation/expansion of organic components into the lower pressure permeate vapor can result in considerable cooling by the Joule-Thomson effect. Since the feed and permeate streams are in good thermal contact, this tends to reduce the temperature not only of the permeate stream, but also of the liquid remaining on the feed side. Thus the fluid at the residue end of the membrane modules may be as much as 20° C., 30° C. or more cooler than the fluid at the feed inlet, resulting in a much lower vapor pressure on the feed side at the residue end.

If this type of problem occurs, it may be ameliorated by breaking the pervaporation step into several sub-steps, and reheating the feed stream between each sub-step.

If multiple membrane modules are used, the individual modules or banks of modules may provide like or unlike separation factors.

A second type of membrane separation operation capable of treating a feed liquid containing organic(s) and water and producing a vapor permeate is membrane distillation. In membrane distillation, a porous membrane is used to divide the liquid and vapor phases, and the separation obtained is based on the vapor-liquid equilibrium of the components to be separated under the prevailing conditions of temperature and pressure. A sweep gas or vapor, such as nitrogen, may be used on the permeate side.

The membrane should be of a material that is not wetted by the feed liquid. Suitable membranes for use in the present invention include Celgard® polypropylene membranes, available from Celgard Inc., of Charlotte, N.C., and Teflon®, that is, polytetrafluoroethylene (PTFE) membranes, such as those available from Compact Membrane Systems, of Wilmington, Del.

Since separation depends on the vapor-liquid equilibrium at the prevailing conditions, the feed may be supplied to the membrane at warmer than ambient temperatures. In addition, or alternatively, a sweep gas, such as nitrogen, may be used on the permeate side to remove the permeating vapor continuously. Such a process offers benefits in handling thermally labile flavor compounds, for example. In this case, the feed may be provided to the membrane without heating, and nitrogen used as a sweep gas to carry away the permeating flavor elements from the permeate side.

For simplicity, the detailed description of FIG. 1 that follows refers to the embodiments of the invention in which the feed to the membrane separation step is in the liquid phase and the membrane separation step is pervaporation. However, it will be appreciated by those of skill in the art that FIG. 1 also applies to embodiments in which the membrane separation step is carried out by membrane distillation, the difference being that element 102 of the flow scheme is then a membrane distillation step. The figure also applies to embodiments in which the feed is in the gas phase, as discussed more below.

It should be noted that FIG. 1, and the other figures herein that show process designs are simple flow schematics, intended to make clear aspects of the invention, and that an actual process train will usually contain additional components of a standard type, such as heaters, chillers, condensers, pumps, blowers, other types of separation and/or fractionation equipment, valves, switches, controllers, pressure-, temperature, level- and flow-measuring devices and the like.

Referring now to FIG. 1, feed stream, 101, containing a mixture of organic compounds, is introduced into pervaporation step or unit 102. The pervaporation unit used in this step is equipped with an array of one or more membrane modules. The organic components pass through the membrane as vapors at different rates, depending on the permeability of the membrane to the individual components.

The non-permeating portion of the feed stream is removed as a liquid residue stream, 103. Stream 103 is depleted in the more permeable component(s) and enriched in the less permeable component(s) compared with the feed solution. Stream 103 can pass to any destination. For example, it may be discharged as waste, returned to the originating process, directed to another process, distillation for example, or recycled in part or in whole in a loop around the pervaporation step.

Transport through the membrane is induced by maintaining the vapor pressure on the permeate side of the membrane lower than the vapor pressure of the feed liquid. On the feed side of the membrane, the partial vapor pressure of any component will be the partial pressure of the vapor in equilibrium with the feed solution. Changing the hydrostatic pressure of the feed solution usually has only a small effect on transmembrane flux or selectivity, therefore.

However, the vapor pressure on the feed side is a function of the temperature of the feed solution. Optionally, therefore, the feed may be heated before it is passed to the pervaporation unit to increase driving force, and hence permeation rate, in the pervaporation step.

Although changing the hydrostatic pressure on the feed side has little effect, changing the permeate pressure has a major effect on transmembrane flux. The vapor pressure of a component on the permeate side can be reduced in several ways, for example, by drawing a vacuum on the permeate side of the membrane, by sweeping the permeate side to continuously remove permeating vapor, or by cooling the permeate vapor stream to induce condensation.

In the present invention, the permeate will be partially condensed in the reflux condensation step, and this generates a partial vacuum on the permeate side. Depending on other system parameters, it may be possible to operate the process in this way without the use of a vacuum pump. Optionally, a greater transmembrane driving force, and hence higher flux and greater separation, may be achieved by further reducing the pressure on the permeate side by means of a vacuum pump, 110, positioned as shown in FIG. 1 in the permeate line, 104.

If a vacuum pump is so positioned, the exhaust vapor from the pump enters the dephlegmator at higher pressure than the permeate side pressure. Pressure considerations as they affect the dephlegmation and pervaporation steps are discussed in more detail with respect to FIGS. 10–12 below.

Permeate stream 104 is in the vapor phase, and comprises an organic mixture of a different composition than feed stream 101. Since it is preferred to use a membrane that provides an overall separation factor in favor of the minor component(s) of the feed stream, the permeate vapor will usually be enriched in this minor component(s) and depleted in the other component.

The degree of enrichment obtained in the permeate vapor stream 104 depends on the separation factor provided by the membrane. If the separation factor is less than about 10 or 20, the enrichment is likely to be no more than about 5-, 7-, 8- or 10-fold. Thus, if the preferred permeant concentration in the feed solution is low, such as a few wt %, the concentration in the permeate is usually no more than about 15 wt % or 20 wt %; if the feed concentration is as much as 5 wt % or more, the concentration in the permeate is higher, usually in the range 35 wt %, 40 wt % or above.

With a higher separation factor, such as 50 or above, a greater degree of enrichment is possible. In this case, even if the feed contains only 1 wt % of the preferred permeant, for example, the permeate vapor stream 104 may contain 30 wt %, 40 wt % or more.

The invention also includes processes in which the pervaporation step is performed using a membrane that provides a separation factor in favor of the major component of the feed stream. In this case, the permeate vapor will be yet richer in the major component. For example, if a membrane providing a separation factor in favor of n-butane over isobutane is used to treat a feed containing more than 50% n-butane, the permeate vapor may contain as much as 80 wt % n-butane or more.

Stream 104 is introduced as a feed stream into dephlegmation step or unit 105, at or near the bottom of the unit, as shown in FIG. 1. A coolant stream, 106, is introduced at or near the top of the dephlegmator column as shown in FIG. 1 and flows down a coolant channel or channels that are in heat-exchanging relationship with the channels carrying the upward-flowing feed stream 104.

As mentioned above, the dephlegmator may be of any type capable of providing countercurrent contact and mass transfer between upward-flowing vapor and downward-flowing condensate, and to provide heat exchange as described in the previous paragraph over at least part of the length of the dephlegmator column.

Figure 8:
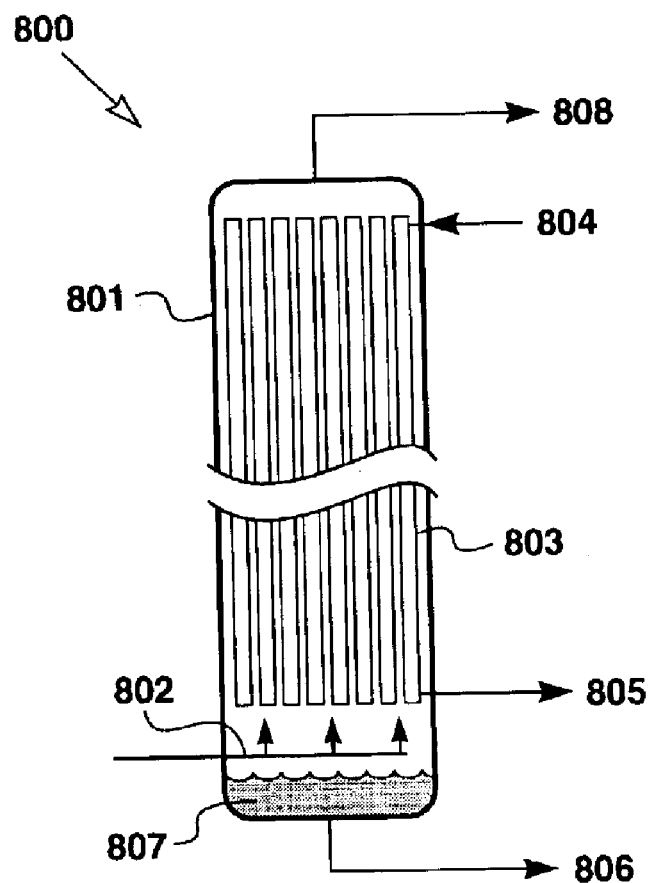
FIG. 8 is a schematic drawing showing a dephlegmator in which cooling is provided by heat exchange with external coolant along the length of the column.

A non-limiting example of a type of dephlegmator that may be used for the process of the invention is a vertical shell-and-tube arrangement in which the cooling medium flows on the shell side and the feed vapor is introduced into the tube bores. A unit of such type is shown in very simple schematic form in FIG. 8.

Referring to this figure, dephlegmator, generally identified as 800, comprises a generally vertically mounted vessel or column, 801, housing coolant tubes, 803. Coolant may be introduced to the shell side space of these tubes through coolant inlet line, 804, and may be withdrawn through coolant outlet line, 805. Feed vapor may be introduced to the bore side of the tubes through inlet system, 802. Condensate, 807, may be withdrawn through condensate outlet line, 806, and overhead vapor emerging from the coolant tubes may be withdrawn through vapor outlet line, 808.

Another example of a suitable type is a vertical brazed aluminum plate-fin design. Similar units are known and used as conventional heat exchangers throughout the chemical engineering industry.

Yet other examples of suitable configurations are columns containing a structured packing that provides for a high surface area of contact between rising vapor and falling condensate. Such a dephlegmator may take the form of a column with an interior volume or volumes of large dimensions containing the structured packing material in a manner similar to that used in a stripping tower. Alternatively, the dephlegmator may take the form of a shell-and-tube heat exchanger, with the structured packing held within the feed-flow channels. Such a configuration gives a very high contact area for heat and mass transfer between vapor and condensate.

The dephlegmator should provide a high heat transfer area per unit volume, such as at least about 100 $m^2/m^3$. In general, shell-and-tube dephlegmators offer heat-exchange densities between about 80 and 300 $m^2/m^3$. If packing is used, this can be increased to about 1,000 $m^2/m^3$. Plate-fin dephlegmators tend to have higher heat-exchange densities, between about 800 and 1,500 $m^2/m^3$.

FIG. 1 shows the coolant stream exiting the column at the bottom as stream 107. Thus, in this case, external cooling is provided over the length of the column, as in FIG. 8. As an alternative, it is possible to provide external cooling only in the upper portion of the column, and to rely on the cool falling condensate to simultaneously provide both heat and mass transfer with the warm rising vapor in the lower portions of the column. In this case, stream 107 will be withdrawn higher up the column at the desired point, as indicated by the dashed line in FIG. 1.

Such an arrangement may incorporate more than one type of dephlegmation configuration. For example, the upper part of the dephlegmator, where most cooling is required and through which the external coolant is passed, may be of the shell-and-tube or plate-fin design, and the lower part, where heat exchange takes place directly between up-flowing vapor. and down-flowing condensate, may take the form of a packed column.

Figure 9:
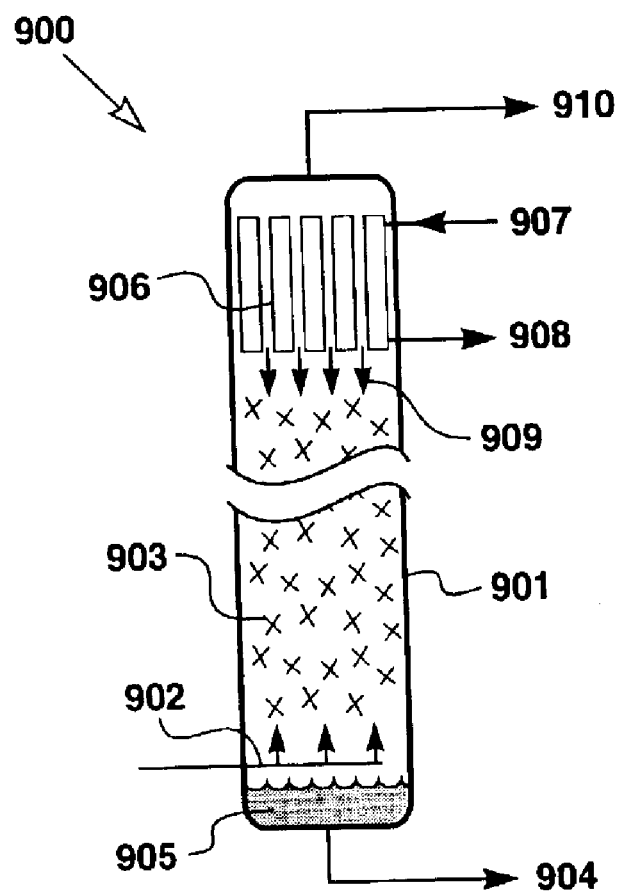
FIG. 9 is a schematic drawing showing a dephlegmator in which heat exchange with external coolant is provided in the upper part of the column, and the lower part contains structured packing.

A simple schematic drawing showing this type of arrangement is given in FIG. 9. Referring to this figure, dephlegmator, generally identified as 900, comprises a generally vertically mounted vessel or column, 901. Within the upper part of the housing are coolant tubes, 906. Coolant may be introduced to the shell side space of these tubes through coolant inlet line, 907, and may be withdrawn through coolant outlet line, 908. Liquid, 909, that has condensed on the tube walls runs out of the bores of the tubes and flows downward. As with the embodiment of FIG. 8, vapor emerging from the top of the coolant tubes may be withdrawn through vapor outlet line, 910.

The lower portion of the vessel is packed with structured packing elements, 903. Liquid 909 descending from the shell-and-tube section can contact rising vapor on the surfaces of the packing elements. Feed vapor may be introduced at the base of the packed section through inlet system, 902. Condensate, 905, may be withdrawn from the bottom of the column through condensate outlet line 904.

More complicated vertical "stacks" including three or more styles of dephlegmation operation are also possible, as are multiple free-standing dephlegmators.

Whatever the physical configuration of the dephlegmator, the coolant may simply be cold water, or may be a refrigerant that cools the vapor to a lower temperature, such as 0° C. or below. The cooling or refrigeration step uses less energy than the comparable cooling or refrigeration step in a simple partial condensation operation. The reason is that only the portion of vapor condensing at the top of the column must be chilled to the lowest temperature. At least some of the cooling duty is performed by the condensate itself as it travels down the column. In contrast, a simple partial condenser has to cool the entirety of the vapor stream to the condensation temperature.

When the process is in operation as shown in FIG. 1, warm membrane permeate vapor passes into the column as stream 104 as shown and rises in the feed passages or channels. A portion of the vapor condenses on the comparatively cold tube or channel walls or packing surfaces; this condensate runs downward within the feed passages, countercurrent to the feed vapor. Mass transfer between the condensate liquid and the vapor enriches the liquid in the less volatile component or components and the vapor in the more volatile component or components.

The liquid condensate, enriched in the less volatile component, exits the dephlegmation step as bottom product stream 108. The vapor stream, enriched in the more volatile component, exits the dephlegmation step as overhead product stream 109. It is also possible to withdraw an intermediate product or products as side streams of different compositions at points along the height of the column.

Variables that affect the performance achieved by the dephlegmator include the coolant temperature, coolant flow rate, composition and temperature of the entering feed vapor, vapor feed rate, and pressure within the dephlegmator. In general, the lower is the temperature of the overhead vapor product stream 109 from the dephlegmator, the higher is the concentration of the more volatile component in that overhead product. A lower overhead product temperature may be achieved by increasing the coolant flow rate, or lowering the coolant temperature, or both.

Also in general, the higher is the temperature of the bottoms condensate product stream 108, the greater is the recovery of the more volatile component in the overhead product stream. A higher bottom product temperature may be achieved by raising the coolant temperature, or lowering the coolant flow rate, or both.

The pressure in the dephlegmator column may be maintained at a pressure that is higher, lower or about the same as the pressure on the permeate side of the pervaporation step.

Typically, a low pressure is preferred on the permeate side of the membrane separation step, to provide good driving force and to exploit membrane selectivity to the full. On the other hand, the higher is the pressure in the dephlegmator, the higher is the coolant temperature that can be used and the greater is the column throughput, both of which tend to favor good cost-effectiveness.

As a general guide, therefore, it is most preferred to operate the dephlegmator at a higher absolute pressure than the permeate side of the pervaporation module.

Figure 10:
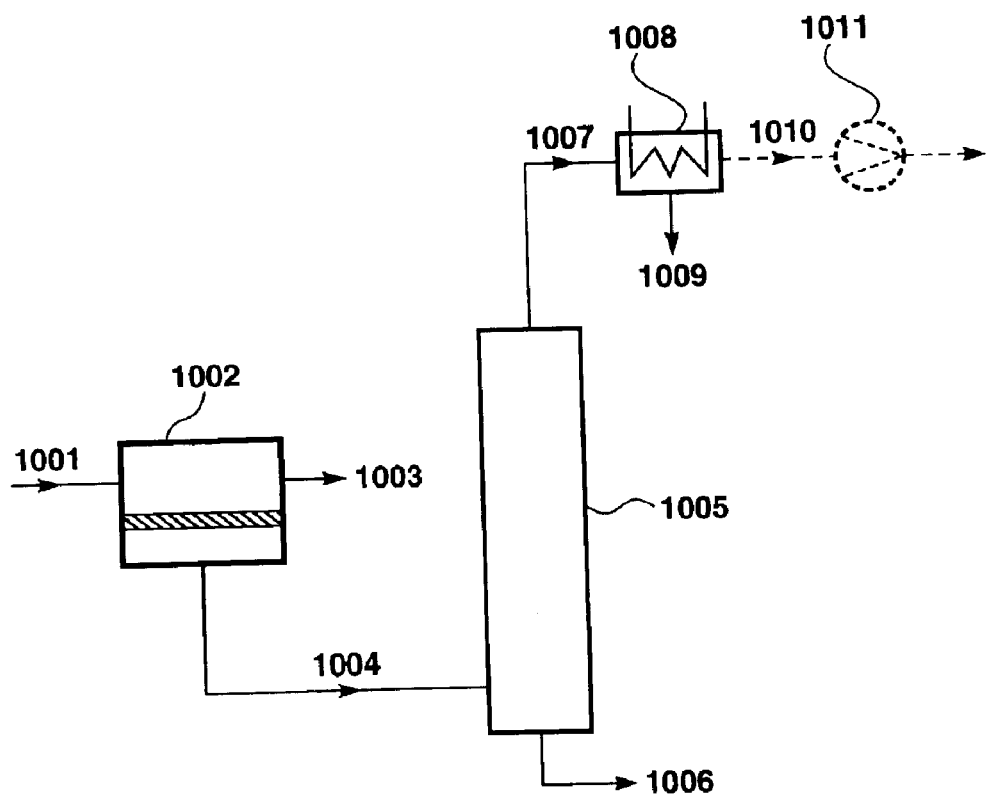
FIG. 10 is a schematic drawing showing an embodiment of the invention in which the overhead stream from the dephlegmator is condensed.
Figure 11:
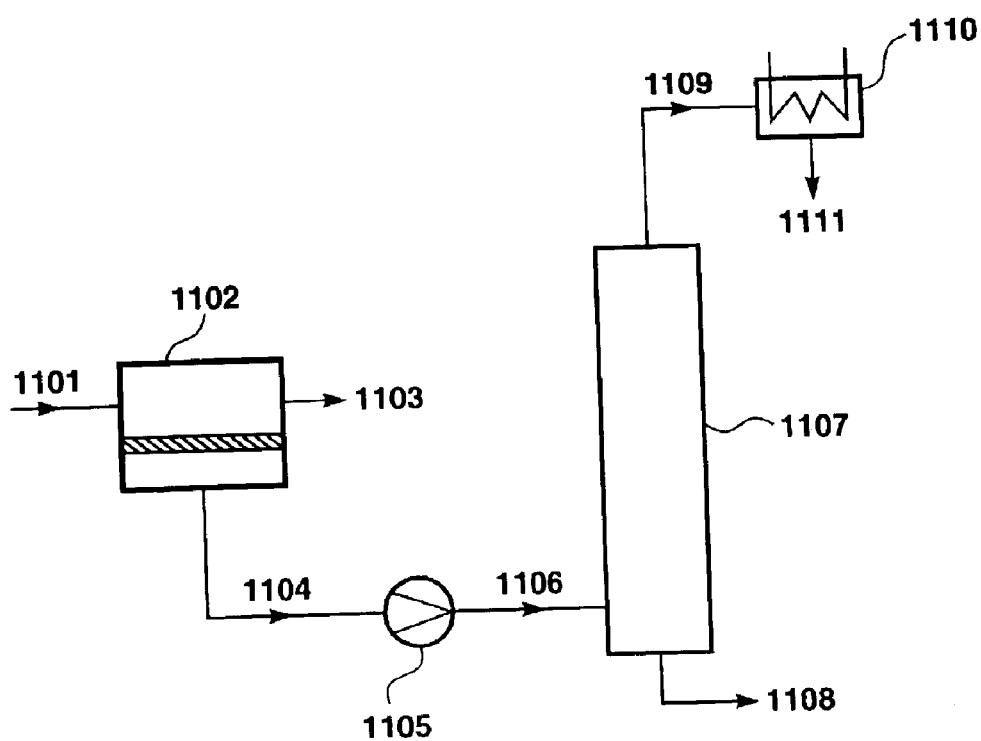
FIG. 11 is a schematic drawing showing an embodiment of the invention in which a vacuum pump is used between the pervaporation unit and the dephlegmator, and the overhead stream from the dephlegmator is condensed.
Figure 12:
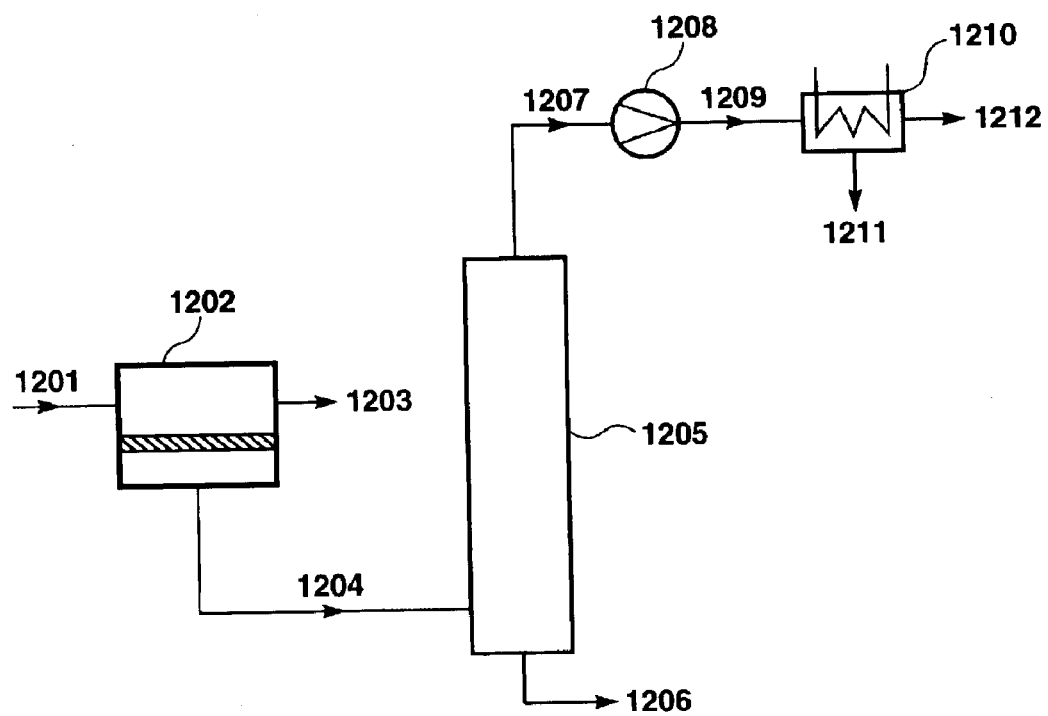
FIG. 12 is a schematic drawing showing an embodiment of the invention in which a vacuum pump or compressor is used in the overhead line from the dephlegmator, and the overhead stream from the dephlegmator is condensed.

FIGS. 10–12 show some representative, non-limiting schemes for controlling the pressures of the unit steps. For simplicity, coolant streams have been omitted from these figures.

Referring first to FIG. 10, this shows a simple, inexpensive process in which the pressure on the permeate side and the pressure in the dephlegmator are the same, subject only to any pressure drop that may occur along the lines. Membrane feed stream, 1001, is introduced into pervaporation unit 1002. The non-permeating portion of the feed stream is removed as liquid residue stream, 1003, and passed to any desired destination.

Permeate stream, 1004, is introduced as a feed stream into dephlegmation step 1005. The liquid condensate exits the dephlegmation step as bottom product stream 1006. The vapor stream, enriched in the more volatile component, exits the dephlegmation step as overhead stream 1007. Overhead stream 1007 passes to condensation step 1008, where the overhead vapor is liquefied and withdrawn as condensate stream, 1009. In this case, the temperature at which this condensation step is operated is the control that determines both the permeate pressure for the pervaporation step and the operating pressure of the dephlegmation step.

If any non-condensable gases are present in the system, they may be removed as stream 1010 by means of a pump 1011. Since this pump has only to process any non-condensed gas, rather than the entire overhead stream, it may be of very small capacity.

FIG. 11 shows an arrangement in which a vacuum pump is used in the permeate line to maintain a lower permeate pressure for the pervaporation step than the dephlegmator operating pressure. Membrane feed stream, 1101, is introduced into pervaporation unit 1102. The non-permeating portion of the feed stream is removed as liquid residue stream, 1103, and passed to any desired destination.

The pressure on the permeate side of the membranes is set by the suction pressure of vacuum pump, 1105, positioned in the permeate line from the pervaporation unit. Permeate stream, 1104, is withdrawn from the pervaporation step at low pressure, passes through pump 1105 and emerges as higher pressure exhaust stream, 1106. This stream is introduced as a feed stream into dephlegmation step 1107. The liquid condensate exits the dephlegmation step as bottom product stream 1108.

The vapor stream, enriched in the more volatile component, exits the dephlegmation step as overhead stream 1109 and is fully condensed in condensation step 1110, forming condensate stream, 1111. The pressure in the dephlegmator column is, therefore, again controlled by the temperature under which step 1110 is operated. If required, an additional small pump could be used as shown in FIG. 10 to remove non-condensable gases.

The arrangement of FIG. 11 provides greater flexibility than that of FIG. 10 in optimizing operating conditions for the unit steps. For unit 1105, a comparatively large pump is needed to handle the entirety of stream 1104, however.

FIG. 12 shows yet another variation. Referring to this figure, membrane feed stream, 1201, is introduced into pervaporation unit 1202. The non-permeating portion of the feed stream is removed as liquid residue stream, 1203, and passed to any desired destination.

Permeate stream, 1204, is introduced as a feed stream into dephlegmation step 1205. The liquid condensate exits the dephlegmation step as bottom product stream 1206. The vapor stream, enriched in the more volatile component, exits the dephlegmation step as overhead stream 1207. As in FIGS. 10 and 11, the overhead stream is condensed. In this embodiment, however, stream 1207 is compressed by passing through compressor, 1208. Compressed stream 1209 is then condensed in condensation step, 1210, to form condensate stream 1211. Any non-condensed gas is removed as stream 1212.

In this embodiment, pressure on the permeate side of the pervaporation step and in the dephlegmator is determined by the suction pressure of pump 1208. Since the pump need only process the overhead vapor, the capacity can be relatively small. This embodiment also enables a convenient temperature to be set independently for the condensation step, without affecting the pressure in the dephlegmator column.

Representative experimental data showing the effects of changing significant operating variables for the dephlegmation step are given in the Examples section of U.S. patent application Ser. No. 10/170,333, filed Jun. 12, 2002, now issued as U.S. Pat. No. 6,755,975. These data apply to the separation of ethanol from water, but are also applicable to separation of organic mixtures of comparable relative volatility.

Early theoretical treatments on the basis of which suitable operating parameters for a specific separation may be calculated by the skilled person are found, for example, in (i) S. Di Cave et al., "Mathematical Model for Process Design and Simulation of Dephlegmators (Partial Condensers) for Binary Mixtures", *Canadian Journal of Chemical Engineering*, Vol. 65, 559–564, 1987; (ii) R. J. Jibb et al., "The Potential for Using Heat Transfer Enhancement in Vent and Reflux Condensers", (available from web site of Cal Galvin Ltd. at http://www.calgalvin.co.uk/news); and (iii) G. A. Lucadamo et al., "Improved ethylene and LPG recovery through dephlegmator technology", *Gas Separation and Purification*, Vol. 1, 94–102, 1987.

Alternatively, the performance of a dephlegmator operation can be modeled using a computer process simulator, such as ChemCad V (ChemStations, Inc., Houston, Tex.), as described in L. M. Vane et al., "Separation of Vapor-Phase Alcohol/Water Mixtures via Fractional Condensation Using a Pilot-Scale Dephlegmator: Enhancement of the Pervaporation Process Separation Factor", *Journal of Membrane Science* (in press in 2003).

The dephlegmation step offers a much higher degree of separation between components than is usually achieved by partial condensation in a simple condenser. In a simple condenser, the vapor and liquid phases leave the heat exchange section together and, therefore, at equilibrium under the prevailing pressure and temperature conditions, so that only a single-stage separation is obtained. In a dephlegmator, the two phases leave at opposite ends, at different temperatures, and the separation obtained is equivalent to multiple separation stages.

A dephlegmator of modest physical dimensions operated under conditions of modest energy expenditure with cool water or glycol as coolant and a moderate temperature difference between overhead and bottoms stream can provide a good separation equivalent to four, six or more theoretical separation stages.

The process of the invention has been described so far as it incorporates a dephlegmation step carried out as a single operation in one dephlegmator column. As will be appreciated by those of skill in the art, the dephlegmation step may also be performed in multiple sub-steps, using two or more dephlegmator columns of similar or dissimilar configuration in series. The vertically stacked dephlegmation sections discussed above may be considered in some regards as such multiple sub-steps.

However, an arrangement of a series of discrete dephlegmation columns is also within the scope of the invention. In this case, the overhead vapor or a portion of the overhead vapor from one column forms the feed to the next. Such an arrangement is useful, for example, to handle a dephlegmator feed solution containing several organic components of differing volatility. By adjusting the operating parameters for each column individually, it is possible to recover discrete organic products of different composition as the bottoms streams from individual columns. For example, a juice evaporator condensate may be processed using a flow scheme of this sort to recover several essence fractions separately.

Either overhead vapor stream 109 or bottom condensate stream 108 may form a primary product of the process, or both may be product streams. Typically, but not necessarily, a primary product stream will contain at least about 90 wt % of the desired component(s).

Figure 2:
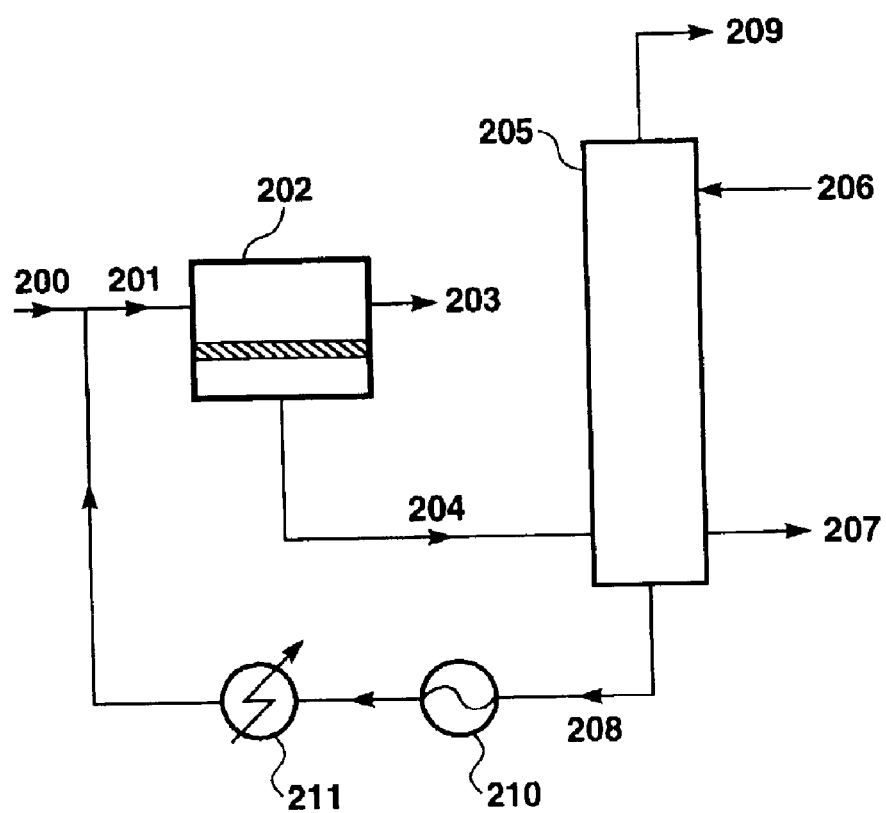
FIG. 2 is a schematic drawing showing an embodiment of the invention in which the bottoms stream from the dephlegmator is recirculated to the membrane separation step.
Figure 3:
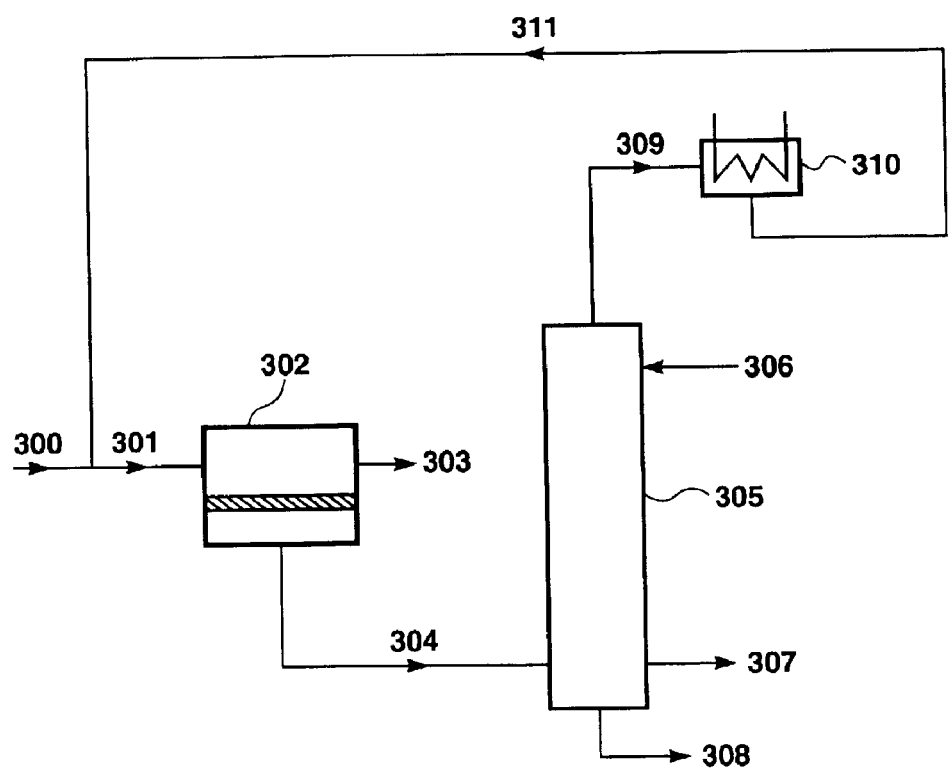
FIG. 3 is a schematic drawing showing an embodiment of the invention in which the overhead stream from the dephlegmator is recirculated to the membrane separation step.

If either stream is not a desired product, it is convenient and preferred to recirculate that stream within the process. FIGS. 2 and 3 show very simple examples of embodiments of this type.

Referring to FIG. 2, raw process feed stream, 200, is combined with recirculating stream, 208, discussed below, and introduced as feed stream, 201, into pervaporation unit 202. The non-permeating portion of the feed stream is removed as liquid residue stream, 203, and passed to any desired destination.

Permeate stream, 204, is introduced as a feed stream into dephlegmation step 205. Coolant is circulated into the dephlegmator as stream 206 and removed as stream 207. The vapor stream, enriched in the more volatile component, exits the dephlegmation step as a desired overhead product stream, 209.

In this case, the condensate that forms during the dephlegmation step is not a desired product. For example, if the raw feed is an azeotrope, this stream may be another azeotrope. It may be possible, and is preferable if possible, to adjust conditions in the dephlegmation step such that the condensate stream, 208, has a composition at least roughly similar to that of the raw feed. Stream 208 passes through liquid pump, 210, and optional heater, 211, and is thence recirculated for reprocessing with the raw feed as shown.

FIG. 3 shows another simple scheme, in which the condensate is the desired product and the overhead stream is recirculated. Referring to this figure, raw process feed stream, 300, is combined with recirculating stream, 311, discussed below, and introduced as feed stream, 301, into pervaporation unit 302. The non-permeating portion of the feed stream is removed as liquid residue stream, 303, and passed to any desired destination.

Permeate stream, 304, is introduced as a feed stream into dephlegmation step 305. Coolant is circulated into the dephlegmator as stream 306 and removed as stream 307. The condensate stream exits the dephlegmation step as a desired bottoms product stream, 308.

Overhead vapor stream 309 is withdrawn from the dephlegmation step, condensed in condensation step, 310, and returned as liquid stream, 311, for reprocessing with the raw feed as shown.

An arrangement of this type may be useful, for example, when the membrane separation step provides a good separation factor in favor of the less volatile component(s), in which case the membrane residue stream 303 may be the most rich in the more volatile components, and may be the primary product stream of the process. Such a situation might arise when a small amount of alcohol is to be removed from an ether, for example, and the pervaporation step uses a membrane that provides a separation factor in favor of the alcohol.

If the dephlegmator overhead stream is a desired product stream, it may be recovered conveniently simply by condensing, as shown in several figures.

The process of the invention can incorporate other separation treatments either upstream or downstream. For example, process feed stream 101 in FIG. 1 may originate as a stream from another separation process, such as absorption, adsorption, solvent extraction, stripping, scrubbing, condensation, evaporation, distillation, or another pervaporation process.

In like manner, there is no restriction on the destination of streams 103, 108 and 109, any of which may be further separated by means of additional pervaporation or dephlegmation treatment, or by distillation, condensation, phase separation, evaporation, stripping, scrubbing, absorption, adsorption or the like.

If one of these streams is required at very high purity, that stream may be further purified by distillation, for example. In this case, the pervaporation/dephlegmation steps are valuable in improving the concentration and reducing the volume of the stream to be distilled.

Figure 4:
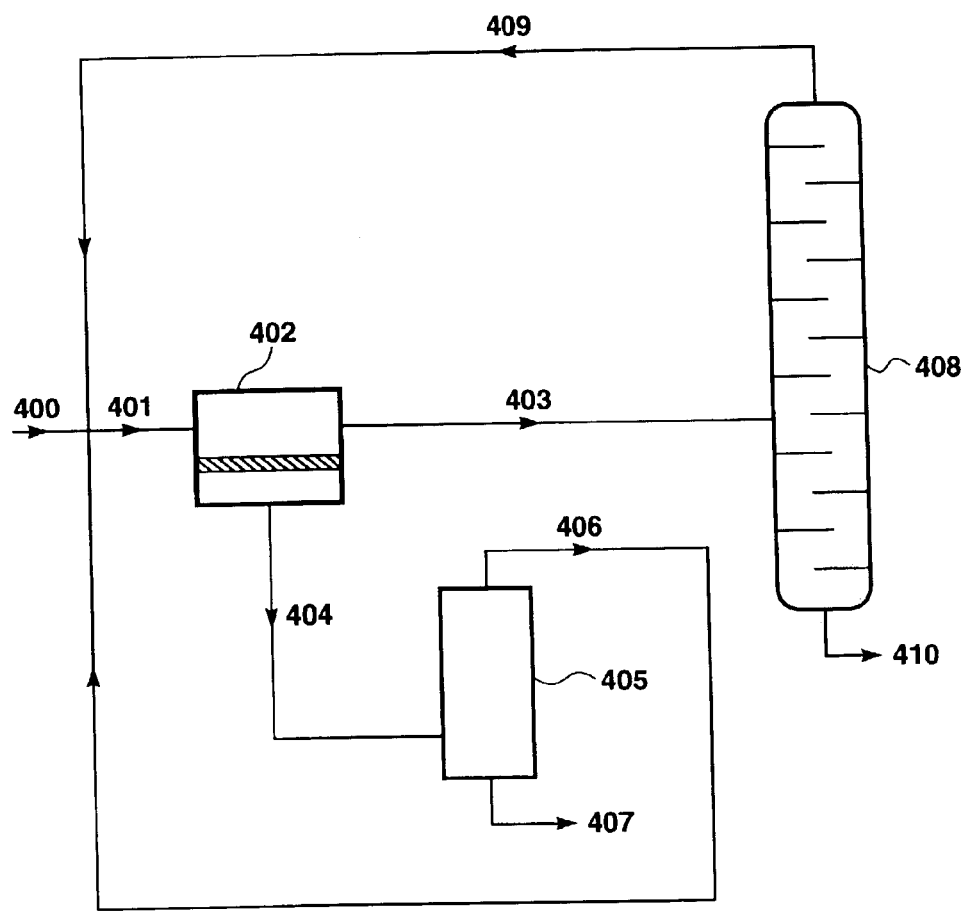
FIG. 4 is a schematic drawing showing an embodiment of the invention in which the residue stream is treated by distillation.

A representative, but non-limiting, application of the process, capable of providing two product streams from an azeotropic mixture, is shown in FIG. 4.

Referring to this figure, raw feed stream 400 is combined with recirculated streams 406 and 409, discussed below, to form feed stream 401 to pervaporation unit 402, which contains membranes that provides a separation factor in favor of one component of the azeotrope, thereby breaking the azeotrope.

Pervaporation unit 402 separates the feed into residue stream, 403, and permeate stream 404. The residue stream is introduced into distillation column, 408, at an appropriate stage. In FIG. 4, it is assumed that the residue stream is enriched in the less volatile component. The distillation column is operated to provide this component in purified form as bottoms product stream 410. The overhead stream, 409, comprises an azeotropic mixture that is lower boiling than the less volatile component and is returned to the feed side of the membrane separation unit.

Permeate stream 404 is enriched in the more volatile component. This stream is passed as feed into dephlegmator 405. The dephlegmator is operated to provide a purified product stream of the more volatile component as condensate bottoms stream 407. The dephlegmator overheard stream, 406, comprises an azeotrope that is lower boiling than the more volatile component and is returned to the feed side of the membrane separation unit.

Those of skill in the art will be able to devise many other similar process schemes, depending on the relative volatilities of the components to be separated and other process parameters and requirements.

So far, the process of the invention has been described as it relates to the treatment of liquid-phase feed streams. In another aspect, the process involves treating feed streams that are in the gas phase. Such feeds may arise because the process generating the feed is itself performed in the gas phase, or may be prepared by boiling a liquid feed to vaporize all or part of the stream before it is introduced into the process.

If the feed has been vaporized by heating, the membranes used to perform the separation should obviously be able to withstand the elevated vapor temperature, which may be as high as 100° C., 150° C., 200° C. or above. For the lower end of the temperature range, polymeric materials as listed above may be used. Few currently available polymer membranes can be operated at temperatures above about 150° C., however, so for temperatures higher than this, inorganic membranes such as those described above are preferred.

Gas phase membrane separation, like pervaporation, is a pressure-driven process, that is, transport through the membrane is induced by maintaining the vapor pressure on the permeate side of the membrane lower than the vapor pressure on the feed side. If the feed has been vaporized by heating, the vapor pressure on the feed side may be high, such as up to 10 atm, 20 atm, 30 atm or more.

In many cases, maintaining the permeate side of the membrane at atmospheric pressure, will, therefore, provide adequate transmembrane driving force. If a greater vapor pressure difference is required, this may be obtained by operating under partial vacuum in similar manner to that described above with respect to pervaporation applications, or by sweeping the permeate side of the membrane with gas or steam, in similar manner to that described above with respect to membrane distillation applications.

If the feed is a gas mixture, the pressure difference between feed and permeate sides may be achieved or enhanced by compressing the feed gas stream, as is well known in the art.

The process of the invention in the gas phase aspect is also illustrated by the flow scheme of FIG. 1. In this case the feed enters the process as gas or vapor stream 101 and passes through membrane gas separation step 102, which can be equipped with membranes of the same types as discussed above. Non-permeating gas or vapor is withdrawn as stream 103. Permeate vapor stream 104 passes to the dephlegmation step, which is carried out generally as described with respect to the pervaporation embodiment above. In this case, it is preferred to maintain the permeate side of the membrane at atmospheric pressure and to pass permeate vapor to the dephlegmator by means of a simple blower.

As with the embodiments discussed previously, any of streams 103, 108 and 109 may constitute product streams, and either of streams 108 and 109 may be recirculated within the process. For example, an embodiment like that of FIG. 2 may be used to recirculate the condensate stream.

Figure 5:
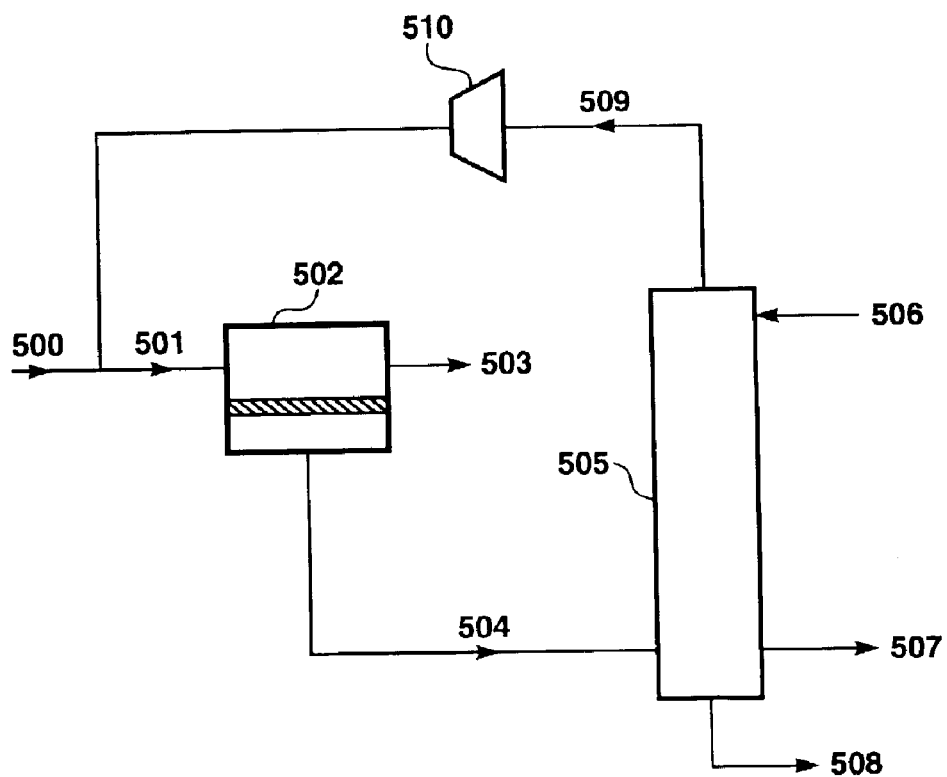
FIG. 5 is a schematic drawing showing an embodiment of the invention in which the feed is in the gas phase and the overhead stream from the dephlegmator is recirculated to the membrane separation step.
Figure 6:
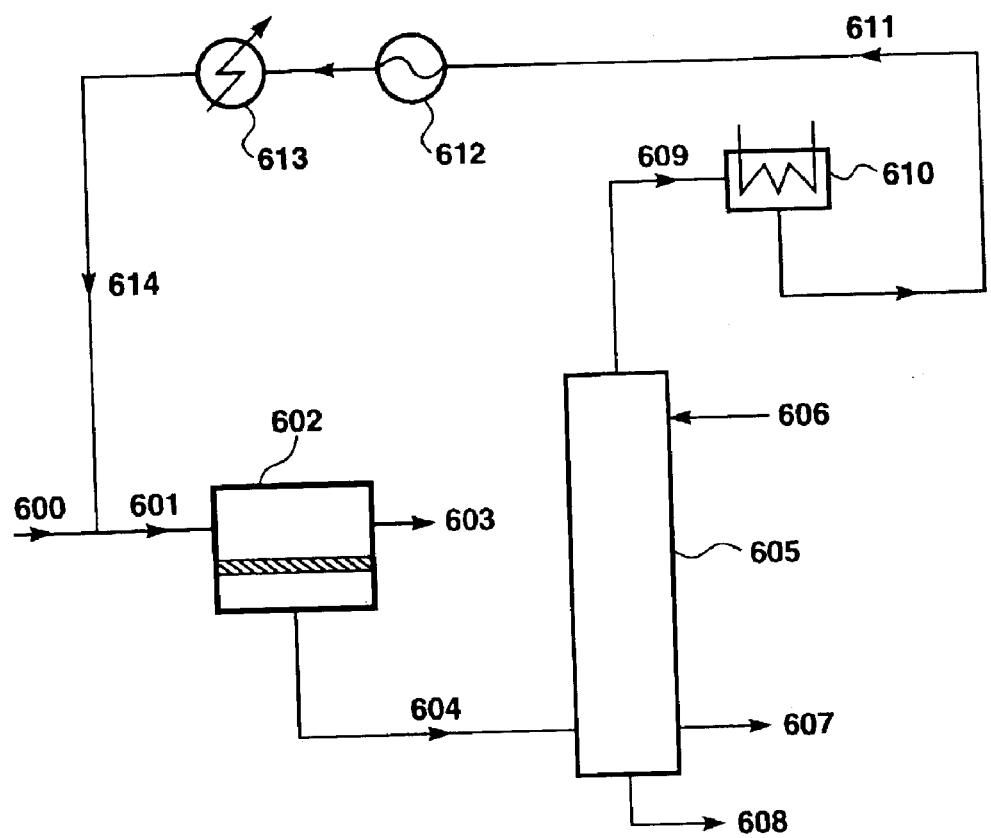
FIG. 6 is a schematic drawing showing a second embodiment of the invention in which the feed is in the gas phase and the overhead stream from the dephlegmator is recirculated to the membrane separation step. In this case the overhead is condensed and reboiled.

If the overhead vapor stream is to be recirculated, simple process schemes such as those shown in FIGS. 5 and 6 may be used, for example. Referring to FIG. 5, raw process feed gas or vapor stream, 500, is combined with recirculating stream, 509, discussed below, and introduced as feed gas stream, 501, into gas separation unit 502. The non-permeating portion of the feed stream is removed as residue stream, 503, and passed to any desired destination.

Permeate stream, 504, is introduced as a feed stream into dephlegmation step 505. Coolant is circulated into the dephlegmator as stream 506 and removed as stream 507. The vapor stream, enriched in the more volatile component, exits the dephlegmation step as overhead stream, 509. This stream is recompressed in compressor 510 and recirculated for reprocessing as shown. Condensate product stream 508 is withdrawn from the bottom of the dephlegmator.

FIG. 6 shows a similar process, in which the condensate is the desired product and the overhead stream is recirculated. Referring to this figure, raw process feed stream, 600, is combined with recirculating stream, 614, discussed below, and introduced as feed stream, 601, into gas separation unit, 602. The non-permeating portion of the feed stream is removed as residue stream, 603, and passed to any desired destination.

Permeate stream, 604, is introduced as a feed stream into dephlegmation step 605. Coolant is circulated into the dephlegmator as stream 606 and removed as stream 607. The condensate stream exits the dephlegmation step as a desired bottoms product stream, 608.

Overhead vapor stream 609 is withdrawn from the dephlegmation step. To repressurize this stream for recirculation, it is first condensed in condensation step, 610. The resulting liquid stream, 611, passes through liquid pump, 612, and is reboiled in heating step, 613, and returned as vapor or gas stream, 614, for reprocessing with the raw feed as shown.

In some instances, this arrangement provides a cheaper alternative for repressurizing the overhead gas than using a compressor as in FIG. 5.

Those skilled in the gas separation and pervaporation arts will recognize that there are other organic/organic mixtures than those explicitly discussed herein that may be amenable to treatment by the membrane separation/dephlegmation process of the invention. Further information regarding membrane separation of organic mixtures may be obtained from Section 5.1 of the review chapter entitled "Pervaporation" by J. Néel in *Membrane Separation Technology Principles and Applications*, R. D. Noble and S. A. Stern, Eds., Elsevier (1995) and from the paper "Pervaporation Comes of Age" by N. Wynn in *Chem. Eng. Progress,* 97, p. 66 (October 2001), for example.

The invention is now further described by the following examples, which are intended to be illustrative of the invention, but are not intended to limit the scope or underlying principles in any way.

EXAMPLES

SET I—Pervaporation Experiments

Example 1
Membrane and Module Preparation

Composite membranes were prepared by standard casting and coating techniques. Asymmetric, microporous poly (etherimide) [PEI] support membranes were prepared, and the resulting membranes were coated with the following:

A polyamide selective layer.

A polydimethylsiloxane (PDMS) sealing/gutter layer followed by a polyamide selective layer.

A polyamide-polyether block copolymer (Pebax® 4011, Atochem, Inc.) selective layer followed by a cellulose acetate sealing layer.

A 40% tetrafluoroethylene/60% 2,2,4-trifluoro-5-trifluorometoxy-1,3-dioxole (Hyflon® AD60, Ausimont, Italy) copolymer selective layer on a gutter layer.

A polyperfluoro (alkenyl vinyl ether) [Cytop®, Asahi Glass, Japan] selective layer, followed by a PDMS sealing layer.

A polyimide selective layer.

In addition, microporous poly(vinylidene fluoride) [PVDF] support membranes were prepared, and the resulting membranes were coated with the following:

A Hyflon® AD60 selective layer on a gutter layer.

A polydimethylsiloxane (PDMS) selective layer.

The resulting composite membranes had selective layers up to a few microns thick. Samples of each finished composite membrane were cut into 12.6 cm$^2$ stamps and tested in a permeation test-cell apparatus with nitrogen and oxygen to determine baseline permeation properties and to ensure that the selective layers were defect-free.

The composite membranes were rolled into 2×12-inch, 2×36-inch, or 4×36-inch spiral-wound modules as are known in the art. The 2-inch modules contained approximately 0.2 m$^2$ and 0.6 m$^2$, respectively, of membrane area; the 4-inch module contained approximately 4.5 m$^2$ of membrane area.

Example 2
Pervaporation Properties

Both membrane stamps and spiral-wound membrane modules with the polyamide selective layer were tested in a pervaporation test system with an ethanol/methyl ethyl ketone (MEK) solution. A small pump was used to circulate the solution through the test module. A vacuum pump was used on the permeate side of the membrane. During the tests, feed and permeate samples were withdrawn for analysis by gas chromatography (GC) or high-pressure liquid chromatography (HPLC). The ethanol concentrations were varied from 8 to 28 wt %, the temperature was varied from 25 to 55° C., and the permeate pressure was varied from 3 to 17 mmHg. Over this concentration range, ethanol and MEK form a series of azeotropes or near azeotropes.

The fluxes were measured, and the selectivities and pervaporation separation factors were calculated. Representative results for polyamide films, composite membrane stamps and spiral-wound modules are shown in Table 1.

TABLE 1

| Feed temp. (° C.) | Permeate pressure (mmHg) | Feed conc. (wt % ethanol) | Permeate conc. (wt % ethanol) | Membrane flux (kg/m$^2$·h) | $\beta_{pervap}$ (EtOH/ MEK) | $\alpha_{membrane}$ (EtOH/ MEK) |
|---|---|---|---|---|---|---|
| 24 µm Polyamide film stamps | | | | | | |
| 25 | 10 | 8–28 | 40–68 | 0.06–0.08 | 4–9 | 9–12 |
| 55 | 10 | 8–28 | 35–59 | 0.18–0.68 | 4–6 | ~4 |
| PEI/PDMS/Polyamide composite stamps | | | | | | |
| 25 | 10 | 18 | 61 | 0.08 | 7 | 9.5 |
| 55 | 10 | 17.5 | 49 | 0.7 | 4.5 | 3.8 |

TABLE 1-continued

| Feed temp. (° C.) | Permeate pressure (mmHg) | Feed conc. (wt % ethanol) | Permeate conc. (wt % ethanol) | Membrane flux (kg/m² · h) | $\beta_{pervap}$ (EtOH/ MEK) | $\alpha_{membrane}$ (EtOH/ MEK) |
|---|---|---|---|---|---|---|
| | | PEI/Polyamide modules | | | | |
| 25 | 3.0 | 14 | 21 | 0.25 | 1.6 | 1.5 |
| 55 | 17 | 32 | 41 | 1.04 | 1.5 | 1.8 |

As can be seen, the membrane separation breaks the azeotrope, producing an ethanol-enriched permeate.

The table lists the overall separation factor, $\beta_{pervap}$, and also the calculated membrane selectivity, $\alpha_{membrane}$, where membrane selectivity is the ratio of the permeability coefficients of ethanol and methyl ethyl ketone.

The overall separation factor is the combination of the separation achieved in the evaporation and membrane permeation steps. Since the feed composition is near-azeotropic, there is little or no separation due to evaporation and the separation is due to the membrane alone.

The relatively poor results for the module tests compared with the membrane stamp tests may have arisen because the membranes used in the modules did not have the PDMS sealing layer, or because of manufacturing defects during module winding.

Example 3
Pervaporation Properties

Both membrane stamps and spiral-wound membrane modules with the Pebax® 4011 selective layer were tested as in Example 2 with a toluene/methyl cyclohexane solution. The mixture is a close-boiling mixture that does not form an azeotrope. The toluene concentrations were varied from 43 to 58 wt %, the temperature was varied from 30 to 60° C., and the permeate pressure was varied from 5 to 10 mmHg. The fluxes were measured, and the selectivities and pervaporation separation factors were calculated.

Representative results for membrane stamps and spiral-wound modules are shown in Table 2.

TABLE 2

| Feed temp. (° C.) | Permeate pressure (mmHg) | Feed conc. (wt % toluene) | Permeate conc. (wt % toluene) | Membrane flux (kg/m² · h) | $\beta_{pervap}$ (Tol./ MeCH) | $\alpha_{membrane}$ (Tol./ MeCH) |
|---|---|---|---|---|---|---|
| 1. Polyetherimide/Pebax ® 4011/cellulose acetate stamps | | | | | | |
| 30 | 6 | 43 | 85 | 0.3 | 7.4 | 14 |
| 60 | 5 | 44 | 82 | 1.3 | 5.9 | 9 |
| 2. Polyetherimide/Pebax ® 4011/cellulose acetate membrane modules | | | | | | |
| 30 | 10 | 58 | 83 | 0.2 | 3.5 | 9 |

The data indicate that the membrane is about 10 times more permeable to toluene than to methyl cyclohexane. Increasing the feed temperature results in higher membrane flux because of the increase in the vapor pressure driving force for permeation. Another factor is increased permeability of the membrane due to greater swelling of the polymer at higher temperatures. The membrane selectivity, however, decreases at the higher temperature due to swelling of the membrane.

The membranes favor toluene, the less volatile component, which results in evaporation and permeation selectivities that partially offset each other. Consequently the overall separation factor is always less than the membrane selectivity.

Example 4

Composite Hyflon-on-PEI membranes prepared as in Example 1 were cut into 12.6 cm² stamps and tested in a permeation test cell with a liquid feed mixture containing 60% propylene and 40% propane at 150 psig and 20° C. The pressure on the permeate side of the test cell was atmospheric.

Figure 15:
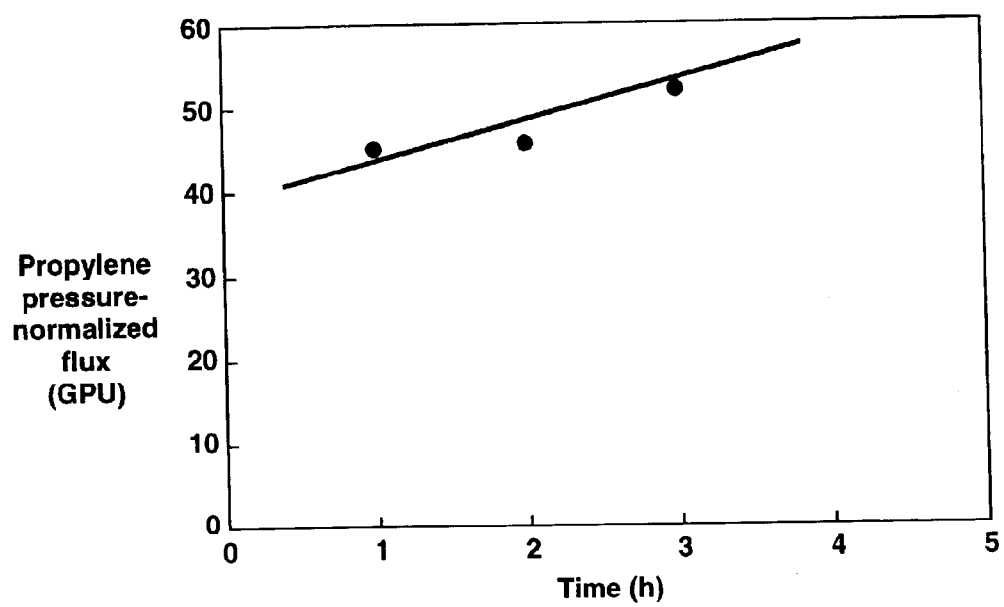
FIG. 15 is a graph showing propylene pressure-normalized flux over time in a test with a Hyflon® composite membrane exposed to a liquid propylene/propane mixture.
Figure 16:
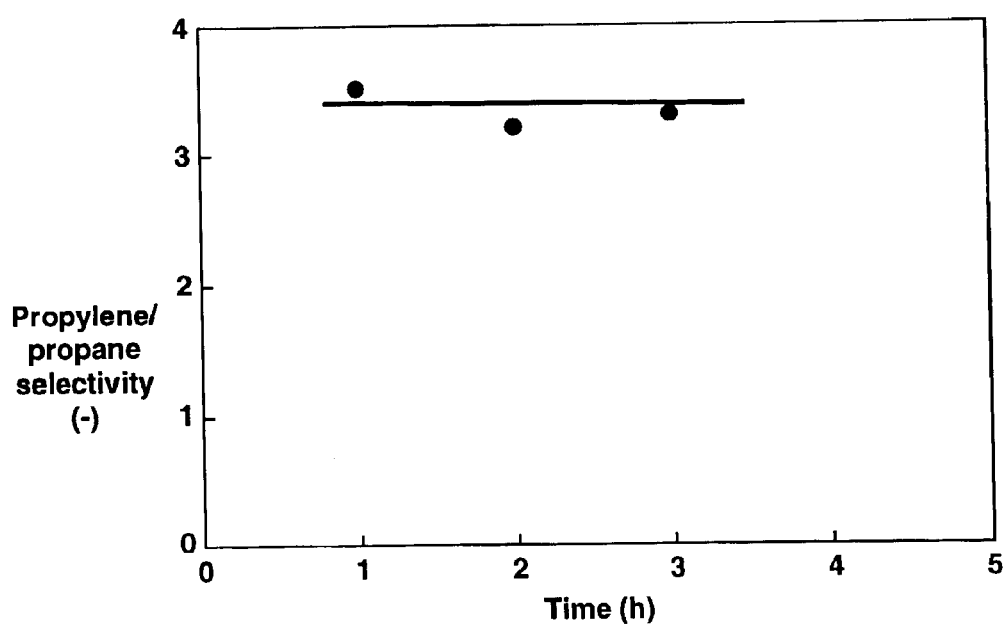
FIG. 16 is a graph showing propylene/propane selectivity over time in a test with a Hyflon® composite membrane exposed to a liquid propylene/propane mixture.

FIGS. 15 and 16 are graphs showing the propylene pressure-normalized flux and the propylene/propane selectivity, respectively, over time. As can be seen, neither the propylene pressure-normalized flux nor the propylene/propane selectivity changed appreciably over time, with the pressure-normalized flux ranging from about 45 to 52 GPU and the selectivity ranging from 3.2 to 3.5. The separation factor ranged from about 3.4 to 3.6.

Example 5

Composite Hyflon-on-PEI membranes prepared as in Example 1 were cut into 12.6 cm² stamps and tested in a permeation test cell with a liquid feed mixture containing 20% ethylene, 20% ethane, 30% propylene, and 30% propane at 150 psig and 20° C. The pressure on the permeate side was atmospheric. The propylene pressure-normalized flux was measured at 38 GPU, and the propylene/propane selectivity was calculated to be 4.

Example 6

Composite Cytop membranes prepared as in Example 1 were cut into 12.6 cm² stamps and tested in a permeation test cell with a liquid feed mixture containing 50% propylene and 50% propane at pressures ranging from approximately 165 to 185 psig and temperatures ranging from approximately 22 to 32° C. The pressure on the permeate side of the test cell was atmospheric. The stamps were tested over a 5-day period, for a total cumulative test period of about 37 hours. Representative permeation results are shown in Table 3.

TABLE 3

| Cumulative Run Time | Feed Pressure | Feed Temperature | Permeate Pressure-Normalized Flux (GPU) | | Propylene/ Propane |
|---|---|---|---|---|---|
| (h) | (psig) | (° C.) | Propylene | Propane | Selectivity |
| 3.5 | 175 | 27 | 16.1 | 4.6 | 3.5 |
| 9.5 | 170 | 27 | 20.9 | 5.8 | 3.6 |
| 15.5 | 170 | 26 | 20.0 | 3.9 | 5.1 |
| 19.5 | 170 | 27 | 21.4 | 4.4 | 4.9 |
| 26.5 | 170 | 26 | 16.8 | 3.4 | 4.9 |
| 30.5 | 170 | 28 | 11.0 | 2.7 | 4.1 |

Figure 17:
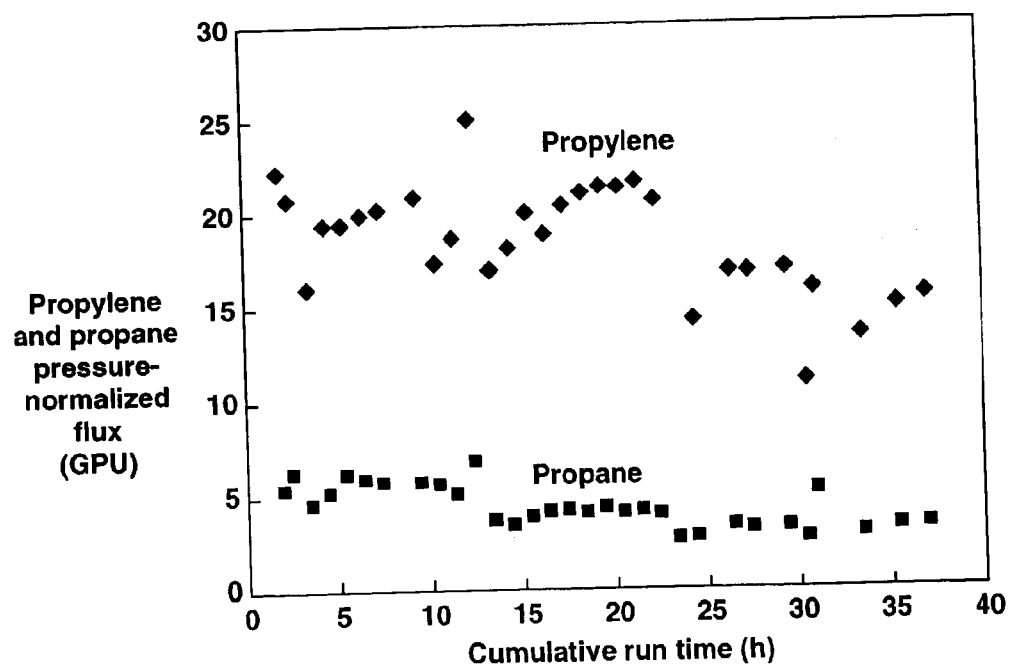
FIG. 17 is a graph showing propylene and propane pressure-normalized flux over time in a test with a Cytop® composite membrane exposed to a liquid propylene/propane mixture.
Figure 18:
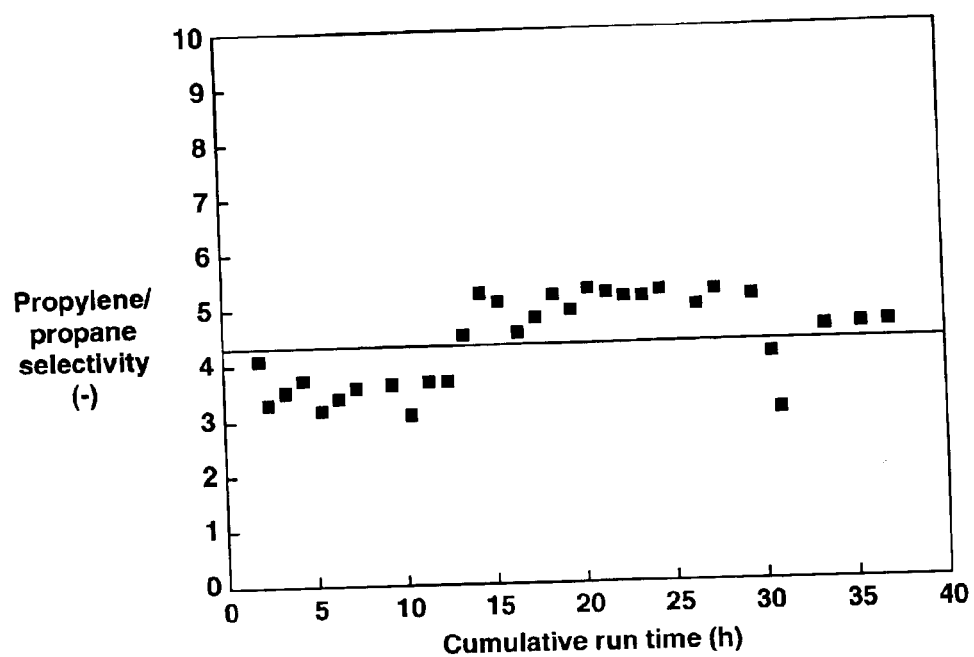
FIG. 18 is a graph showing propylene/propane selectivity over time in a test with a Cytop® composite membrane exposed to a liquid propylene/propane mixture.

FIG. 17 shows the propylene and propane pressure-normalized fluxes and FIG. 18 shows the propylene/propane selectivity for the duration of the experiment. The selectivity averaged about 4.3 and the separation factor averaged about 4.5.

Example 7

The Cytop® membranes prepared as in Example 6 were incorporated into 3-inch-diameter spiral-wound modules with a membrane area of about 1 m², and were tested using a bench-scale module test system. The liquid feed mixture contained 50% propylene and 50% propane, and the tests were conducted at pressures ranging from approximately 150 to 185 psig and temperatures ranging from approximately 27 to 36° C. The pressure on the permeate side of the test cell was atmospheric. The modules were tested over a 3-day period, for a total cumulative test period of about 16 hours. Representative permeation results are shown in Table 4.

TABLE 4

| Cumulative Run Time | Feed Pressure | Feed Temperature | Permeate Pressure-Normalized Flux (GPU) | | Propylene/Propane Selectivity |
|---|---|---|---|---|---|
| (h) | (psig) | (° C.) | Propylene | Propane | |
| 2 | 185 | 30 | 134 | 44.5 | 3.0 |
| 7 | 185 | 34 | 136 | 46.9 | 2.9 |
| 15 | 155 | 28 | 113 | 38.8 | 2.9 |

Figure 19:
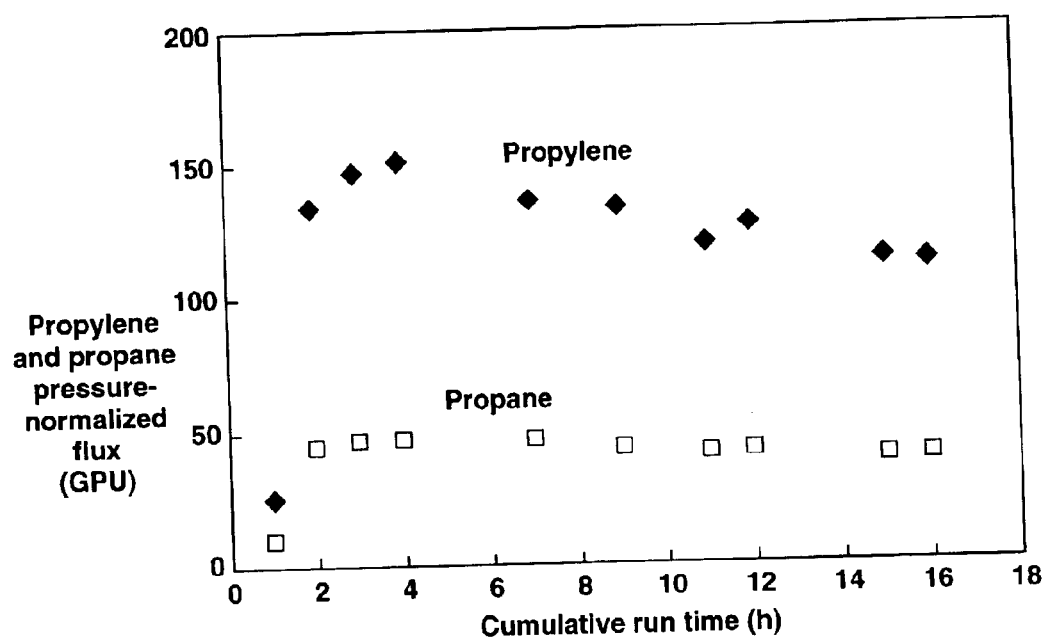
FIG. 19 is a graph showing propylene and propane pressure-normalized flux over time in a test with a spiral-wound module exposed to a liquid propylene/propane mixture.
Figure 20:
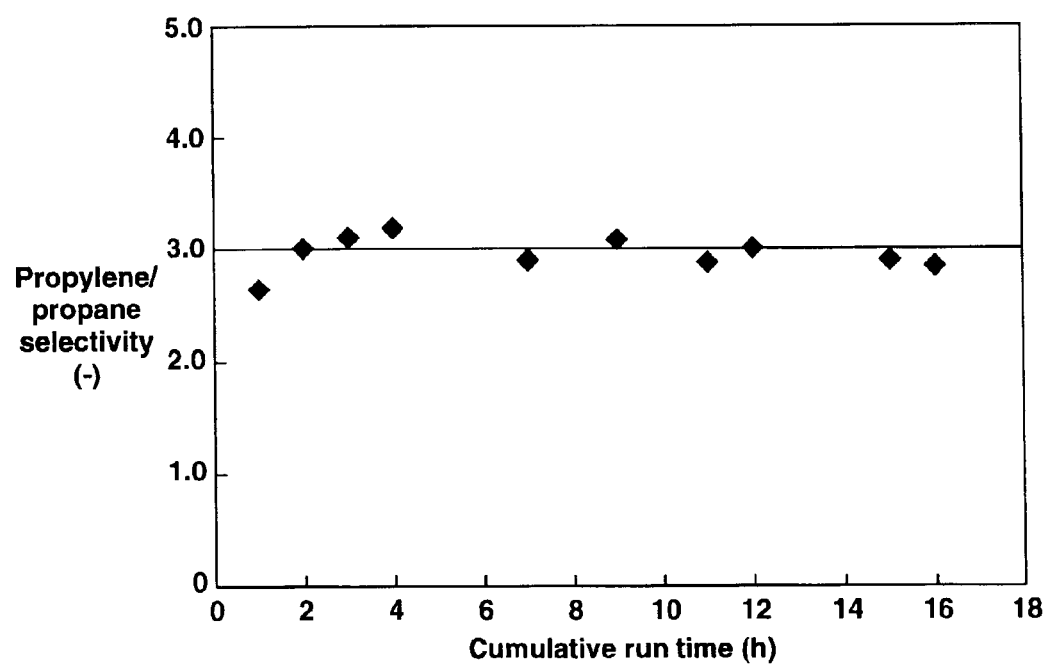
FIG. 20 is a graph showing propylene/propane selectivity over time in a test with a spiral-wound module exposed to a liquid propylene/propane mixture.

FIG. 19 shows the propylene and propane pressure-normalized fluxes and FIG. 20 shows the propylene/propane selectivity, for the duration of the experiment. The selectivity and separation factor both averaged about 3.0.

Example 8

Composite membranes prepared as in Example 1 with two different grades of 6FDA polyimide were cut into 12.6-cm$^2$ stamps and tested in a permeation test cell apparatus with a 50 vol % propylene/50 vol % propane gas mixture. The feed temperature was 25° C. and the feed pressure was 65 psia. The permeate side of the test cell was maintained at atmospheric pressure.

During each test, the feed, permeate and residue compositions were analyzed by gas chromatography (GC). The gas fluxes of the membranes were measured and the selectivities were calculated. The results are shown in Table 5.

TABLE 5

| Membrane Selective Layer | Pressure-Normalized Flux (GPU) | | Selectivity (–) |
|---|---|---|---|
| | $C_3H_6$ | $C_3H_8$ | $C_3H_6/C_3H_8$ |
| 6FDA-TMPD | 210 | 70 | 3.0 |
| 6FDA-NDA | 20 | 3.1 | 6.5 |

Example 9

Hyflon AD60/PVDF composite membranes prepared as in Example 1 were cut into 12.6-cm$^2$ stamps and tested in a permeation test cell apparatus with a 50 vol % n-butane/50 vol % i-butane gas mixture. The feed temperature was increased from 20° C. to 80° C. in 20° C. increments. Each temperature was maintained for five hours. The feed pressure was altered at each temperature to maintains 80% vapor activity in the gas mixture. The permeate side of the test cell was maintained at atmospheric pressure.

The gas fluxes of the membranes were measured and the selectivities were calculated. The results are shown in Table 6.

TABLE 6

| Feed Temperature (° C.) | Feed Pressure (psig) | Permeate Pressure-Normalized Flux (GPU) | | n-Butane/i-Butane Selectivity |
|---|---|---|---|---|
| | | n-Butane | i-Butane | |
| 20 | 15 | 3.1 | 0.3 | 8.9 |
| 40 | 37 | 6.2 | 0.9 | 6.9 |
| 60 | 72 | 10.1 | 1.8 | 5.6 |
| 80 | 117 | 40.1 | 9.4 | 4.3 |

The n-butane pressure-normalized flux increases substantially, from 3 to 40 GPU, with increasing temperature. As expected, selectivity declines with increasing temperature.

Example 10

The 2-inch spiral-wound PDMS membrane module was tested in a pervaporation test system with tangerine oil, which contains approximately 90 wt % terpenes and 10 wt % oxygenates. In general, the oxygenates are higher value, desirable components and the terpenes are less desirable. The test was to evaluate whether a pervaporation/dephlegmation process could be used to improve the oil quality by enhancing the oxygenate content.

A small pump was used to circulate the solution through the test module. The feed temperature was 45° C. A vacuum pump was used to create a permeate pressure of 3 mmHg, and a permeate condenser system collected the liquified permeate vapor. During the tests, feed, permeate, and residue samples were withdrawn for analysis by gas chromatography (GC) or high-pressure liquid chromatography (HPLC). The average flux over a 30-minute test was 0.3 kg/m$^2$·h. The results shown Table 7.

TABLE 7

| Class of Compounds | Component | Feed Conc. (µg/ml) | Permeate Conc. (µg/ml) | Residue Conc. (µg/ml) | Feed-to-Permeate Enrichment |
|---|---|---|---|---|---|
| Oxygenates | Ethyl Acetate | 4,791 | 16,277 | 4,396 | 3.7 |
| | Ethyl Butyrate | 4,416 | 10,796 | 4,521 | 2.4 |
| | Other higher-boiling alcohols and aldehydes | 12,353 | 3,053 | 11,831 | — |
| | Totals | 21,560 | 30,126 | 20,748 | — |
| Terpenes | Limonene | 613,176 | 583,315 | 631,465 | 0.9 |
| | Other terpenes | 66,481 | 63,783 | 48,507 | — |
| | Totals | 679,657 | 647,098 | 679,972 | — |

The test showed good enrichment of the oxygenates ethyl acetate and ethyl butyrate in the permeate. The ethyl acetate content increased from about 0.7 wt % to about 2.4 wt %, and the ethyl butyrate from about 0.6 wt % to about 1.6 wt %. The permeate is also depleted in the predominant terpene, limonene.

Limonene has a much higher boiling point (about 175° C.) than ethyl acetate (about 77° C.) and ethyl butyrate (about 120° C.). In a real process, therefore, this permeate would be well separated by dephlegmation.

SET II Dephlegmator Performance Parametric Calculations

Examples 11–24
Product Purity as a Function of Product Recovery

A series of computer calculation was performed with a modeling program, ChemCad V (ChemStations, Inc., Houston, Tex.), to illustrate the separation achieved by the process of the invention. The stream to be treated was assumed to be a liquid mixture containing 40 wt % benzene/ 60 wt % n-octane at a temperature of 100° C. and under an applied pressure of 100 psia.

The stream was assumed to be treated by pervaporation using a membrane providing a separation factor of 10 in favor of benzene over n-octane, and maintaining a pressure of 2 psia on the permeate side.

In a first set of calculations, the permeate vapor stream was assumed to be sent for fractional condensation in a two-stage condensation system. The vapor was assumed to be partially condensed at a higher temperature in the first stage. The vapor phase from the first stage was assumed to be cooled to a lower temperature sufficient to fully condense it in the second stage, thereby yielding a liquid benzene-rich product. The calculations were performed under conditions such that this product represented varying fractions of the total feed. The results of the calculations are summarized in Tables 8–13 in Examples 11–16 below.

Example 11
Pervaporation Performance Calculation.

TABLE 8

| Stream | Feed | Residue | Permeate |
|---|---|---|---|
| Mass flow (lb/h) | 2,205 | 1,208 | 997 |
| Temp. (° C.) | 100 | 97.4 | 95.2 |
| Pressure (psia) | 100 | 100 | 2 |
| Component (wt %): | | | |
| Benzene | 40.0 | 2.8 | 85.0 |
| n-Octane | 60.0 | 97.2 | 15.0 |

Membrane area = 1,654 m²

Examples 12–16
Condensation Step Performance

Example 12

Essentially all of the feed to the first condenser stage remains in the vapor state; second-stage product is close to 100% of raw feed.

TABLE 9

| Stream | Feed | First-stage overhead (Feed to second stage) | First-stage condensate |
|---|---|---|---|
| Mass flow (lb/h) | 220.5 | 220.0 | 0.5 |
| Temp. (° C.) | 32.29 | 32.27 | 32.27 |
| Pressure (psia) | 2 | 2 | 2 |
| Component (mol %): | | | |
| Benzene | 89.2 | 89.3 | 56.1 |
| n-Octane | 10.8 | 10.7 | 43.9 |
| Component (wt %) | | | |
| Benzene | 85.0 | 85.0 | 46.7 |
| n-Octane | 15.0 | 15.0 | 53.3 |

Example 13

About 75% of the feed to the first condenser stage remains in the vapor state, and is recovered in the second condenser stage.

TABLE 10

| Stream | Feed | First-stage overhead (Feed to second stage) | First-stage condensate |
|---|---|---|---|
| Mass flow (lb/h) | 220 | 162 | 58 |
| Temp. (° C.) | 32.3 | 28.5 | 28.5 |
| Pressure (psia) | 2 | 2 | 2 |
| Component (mol %): | | | |
| Benzene | 89.2 | 94.0 | 74.8 |
| n-Octane | 10.8 | 6.0 | 25.2 |
| Component (wt %) | | | |
| Benzene | 85.0 | 91.5 | 66.9 |
| n-Octane | 15.0 | 8.5 | 33.1 |

Example 14

About 50% of the feed to the first condenser stage remains in the vapor state, and is recovered in the second condenser stage.

TABLE 11

| Stream | Feed | First-stage overhead (Feed to second stage) | Condensate |
|---|---|---|---|
| Mass flow (lb/h) | 220 | 107 | 113 |
| Temp. (° C.) | 32.3 | 27.3 | 27.3 |
| Pressure (psia) | 2 | 2 | 2 |
| Component (mol %): | | | |
| Benzene | 89.2 | 95.8 | 82.7 |
| n-Octane | 10.8 | 4.2 | 17.3 |
| Component (wt %) | | | |
| Benzene | 85.0 | 93.9 | 76.6 |
| n-Octane | 15.0 | 6.1 | 23.4 |

Example 15

About 25% of the feed to the first condenser stage remains in the vapor state, and is recovered in the second condenser stage.

TABLE 12

| Stream | Feed | First-stage overhead (Feed to second stage) | First-stage condensate |
|---|---|---|---|
| Mass flow (lb/h) | 220 | 53 | 167 |
| Temp. (° C.) | 32.3 | 26.7 | 26.7 |
| Pressure (psia) | 2 | 2 | 2 |
| Component (mol %): | | | |
| Benzene | 89.2 | 96.6 | 86.8 |
| n-Octane | 10.8 | 3.4 | 13.2 |
| Component (wt %) | | | |
| Benzene | 85.0 | 95.1 | 81.8 |
| n-Octane | 15.0 | 4.9 | 18.2 |

Example 16

Essentially all (99%) of the feed to the first condenser stage is condensed in that stage, so there is essentially no recovery in the second stage.

TABLE 13

| Stream | Feed | First-stage overhead (Feed to second stage) | First-stage condensate |
|---|---|---|---|
| Mass flow (lb/h) | 220 | 2 | 218 |
| Temp. (° C.) | 32.3 | 26.3 | 26.3 |
| Pressure (psia) | 2 | 2 | 2 |
| Component (mol %): | | | |
| Benzene | 89.2 | 97.1 | 89.2 |
| n-Octane | 10.8 | 2.9 | 10.8 |
| Component (wt %) | | | |
| Benzene | 85.0 | 95.9 | 84.9 |
| n-Octane | 15.0 | 4.1 | 15.1 |

Figure 13:
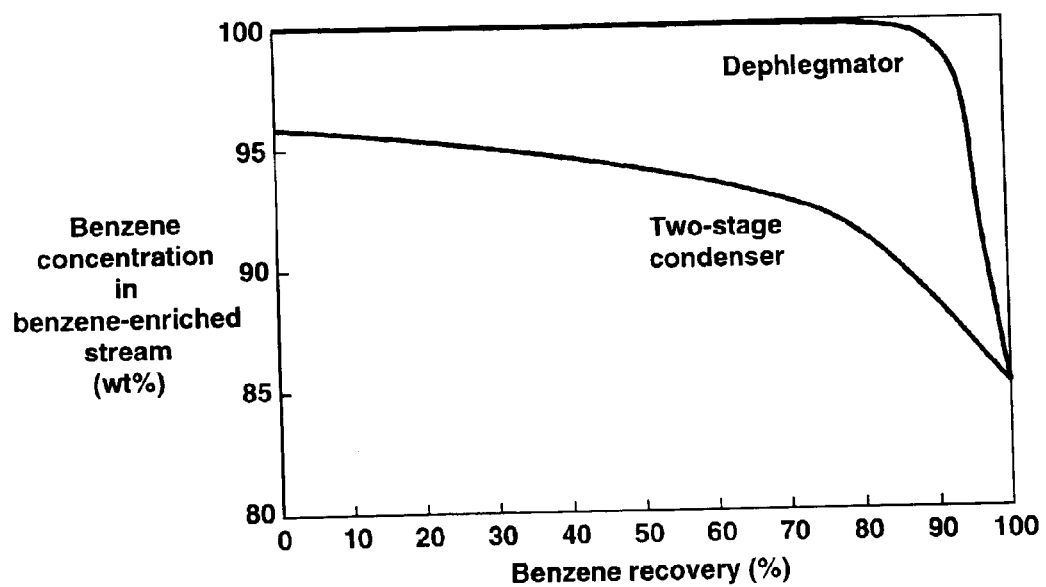
FIG. 13 is a graph showing the concentration of benzene in the dephlegmator overhead vapor product as a function of benzene recovery calculated by means of computer modeling for a process in which benzene is separated from n-octane.

The purity of the benzene product from the condensation steps as a function of benzene recovery in the second-stage condensate is shown graphically in FIG. 13.

A second set of calculations was performed, this time assuming that the permeate vapor stream was sent to a dephlegmator that provides the equivalent of ten vapor-liquid equilibrium stages.

The calculations were performed by varying the heat duty (cooling duty) of the dephlegmator so that the total overhead benzene-rich product represented varying fractions of the total feed. The results of the calculations are summarized in Tables 14–21 in Examples 17–24 below.

Example 17

Heat duty −0.08 MMBtu/h. Essentially no condensation, so that essentially all of the feed to the dephlegmator is recovered as overhead.

TABLE 14

| Stream | Feed | Overhead | Bottoms |
|---|---|---|---|
| Mass flow (lb/h) | 2,205 | 2,198 | 7 |
| Temp. (° C.) | 100 | 32.2 | 37.8 |
| Pressure (psia) | 2 | 2 | 2 |
| Component (wt %): | | | |
| Benzene | 85.0 | 85.2 | 29.7 |
| n-Octane | 15.0 | 14.8 | 70.3 |

Example 18

Heat duty −0.1 MMBtu/h. About 95 wt % of the feed to the dephlegmator remains in the vapor overhead.

TABLE 15

| Stream | Feed | Overhead | Bottoms |
|---|---|---|---|
| Mass flow (lb/h) | 2,205 | 2,102 | 102 |
| Temp. (° C.) | 100 | 30.8 | 37.8 |
| Pressure (psia) | 2 | 2 | 2 |
| Component (wt %): | | | |
| Benzene | 85.0 | 87.7 | 29.8 |
| n-Octane | 15.0 | 12.3 | 70.2 |

Example 19

Heat duty −0.125 MMBtu/h. About 90 wt % of the feed to the dephlegmator remains in the vapor overhead.

TABLE 16

| Stream | Feed | Overhead | Bottoms |
|---|---|---|---|
| Mass flow (lb/h) | 2,205 | 1,953 | 252 |
| Temp. (° C.) | 100 | 28.2 | 37.8 |
| Pressure (psia) | 2 | 2 | 2 |
| Component (wt %): | | | |
| Benzene | 85.0 | 92.1 | 29.8 |
| n-Octane | 15.0 | 7.9 | 70.2 |

Example 20

Heat duty −0.15 MMBtu/h. About 80 wt % of the feed to the dephlegmator remains in the vapor overhead.

TABLE 17

| Stream | Feed | Overhead | Bottoms |
|---|---|---|---|
| Mass flow (lb/h) | 2,205 | 1,801 | 404 |
| Temp. (° C.) | 100 | 25.7 | 37.7 |
| Pressure (psia) | 2 | 2 | 2 |
| Component (wt %): | | | |
| Benzene | 85.0 | 97.4 | 29.9 |
| n-Octane | 15.0 | 2.7 | 70.1 |

Example 21

Heat duty −0.2 MMBtu/h. About 70 wt % of the feed to the dephlegmator remains in the vapor overhead.

TABLE 18

| Stream | Feed | Overhead | Bottoms |
|---|---|---|---|
| Mass flow (lb/h) | 2,205 | 1,520 | 685 |
| Temp. (° C.) | 100 | 24.8 | 31.1 |
| Pressure (psia) | 2 | 2 | 2 |
| Component (wt %): | | | |
| Benzene | 85.0 | 99.8 | 52.1 |
| n-Octane | 15.0 | 0.2 | 47.9 |

Example 22

Heat duty −0.25 MMBtu/h. About 55 wt % of the feed to the dephlegmator remains in the vapor overhead.

TABLE 19

| Stream | Feed | Overhead | Bottoms |
|---|---|---|---|
| Mass flow (lb/h) | 2,205 | 1,241 | 964 |
| Temp. (° C.) | 100 | 24.8 | 28.7 |
| Pressure (psia) | 2 | 2 | 2 |
| Component (wt %): | | | |
| Benzene | 85.0 | 99.96 | 65.7 |
| n-Octane | 15.0 | 0.04 | 34.3 |

Example 23

Heat duty −0.3 MMBtu/h. About 45 wt % of the feed to the dephlegmator remains in the vapor overhead.

TABLE 20

| Stream | Feed | Overhead | Bottoms |
|---|---|---|---|
| Mass flow (lb/h) | 2,205 | 962 | 1,243 |
| Temp. (° C.) | 100 | 24.8 | 27.7 |
| Pressure (psia) | 2 | 2 | 2 |
| Component (wt %): | | | |
| Benzene | 85.0 | 99.99 | 73.4 |
| n-Octane | 15.0 | 0.01 | 26.6 |

Example 24

Heat duty −0.4 MMBtu/h. About 20 wt % of the feed to the dephlegmator remains in the vapor overhead.

TABLE 21

| Stream | Feed | Overhead | Bottoms |
|---|---|---|---|
| Mass flow (lb/h) | 2,205 | 404 | 1801 |
| Temp. (° C.) | 100 | 24.8 | 26.7 |
| Pressure (psia) | 2 | 2 | 2 |
| Component (wt %): | | | |
| Benzene | 85.0 | 99.999+ | 81.6 |
| n-Octane | 15.0 | <0.001 | 18.4 |

The purity of the overhead benzene product as a function of benzene recovery in the overhead is shown graphically in FIG. 13.

As can be seen, the dephlegmator achieves a substantially better trade-off between recovery and product purity than can be achieved by fractional condensation. For example, a product containing 95 wt % benzene can be achieved at 95% benzene recovery using the dephlegmator, whereas recovery is only about 30% using fractional condensation.

Furthermore, the dephlegmator can provide a benzene product of 99+ wt % benzene purity, in conjunction with benzene recovery as high as 90%.

Examples 25–29
Product Purity as a Function of Number of Dephlegmator Stages

A third set of calculations was performed, this time varying the number of theoretical stages of separation that the dephlegmator was assumed to provide.

The results of the calculations are summarized below in Tables 22–26.

Example 25
Dephlegmator Performance Equivalent to 10 Theoretical Stages.

TABLE 22

| Stream | Feed | Overhead | Bottoms |
|---|---|---|---|
| Mass flow (lb/h) | 2,205 | 1,662 | 543 |
| Temp. (° C.) | 100 | 24.9 | 33.9 |
| Pressure (psia) | 2 | 2 | 2 |
| Component (wt %): | | | |
| Benzene | 85.0 | 99.5 | 40.5 |
| n-Octane | 15.0 | 0.5 | 59.5 |

Example 26
Dephlegmator Performance Equivalent to 8 Theoretical Stages.

TABLE 23

| Stream | Feed | Overhead | Bottoms |
|---|---|---|---|
| Mass flow (lb/h) | 2,205 | 1,663 | 542 |
| Temp. (° C.) | 100 | 25.0 | 33.6 |
| Pressure (psia) | 2 | 2 | 2 |
| Component (wt %): | | | |
| Benzene | 85.0 | 99.2 | 41.4 |
| n-Octane | 15.0 | 0.8 | 58.6 |

Example 27
Dephlegmator Performance Equivalent to 6 Theoretical Stages.

TABLE 24

| Stream | Feed | Overhead | Bottoms |
|---|---|---|---|
| Mass flow (lb/h) | 2,205 | 1,665 | 540 |
| Temp. (° C.) | 100 | 25.2 | 33.2 |
| Pressure (psia) | 2 | 2 | 2 |
| Component (wt %): | | | |
| Benzene | 85.0 | 98.6 | 43.1 |
| n-Octane | 15.0 | 1.4 | 56.9 |

Example 28
Dephlegmator Performance Equivalent to 4 Theoretical Stages.

TABLE 25

| Stream | Feed | Overhead | Bottoms |
|---|---|---|---|
| Mass flow (lb/h) | 2,205 | 1,668 | 537 |
| Temp. (° C.) | 100 | 25.7 | 32.3 |
| Pressure (psia) | 2 | 2 | 2 |
| Component (wt %): | | | |
| Benzene | 85.0 | 97.3 | 46.7 |
| n-Octane | 15.0 | 2.7 | 53.3 |

Example 29
Dephlegmator Performance Equivalent to 2 Theoretical Stages.

TABLE 26

| Stream | Feed | Overhead | Bottoms |
|---|---|---|---|
| Mass flow (lb/h) | 2,205 | 1,675 | 530 |
| Temp. (° C.) | 100 | 27.1 | 30.4 |
| Pressure (psia) | 2 | 2 | 2 |
| Component (wt %): | | | |
| Benzene | 85.0 | 94.3 | 55.6 |
| n-Octane | 15.0 | 5.7 | 44.4 |

Figure 14:
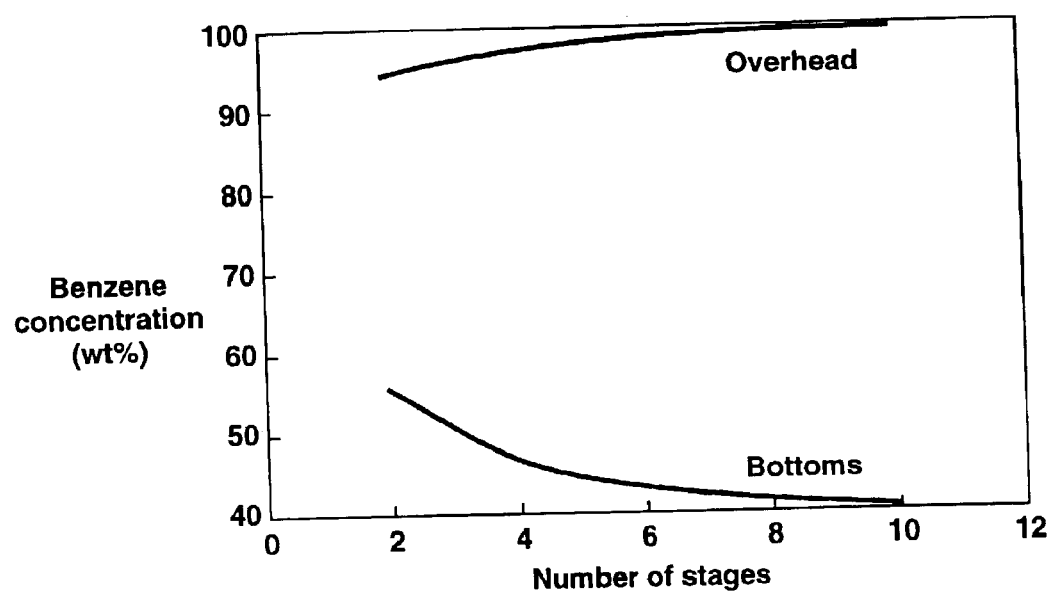
FIG. 14 is a graph showing the concentration of benzene in the dephlegmator overhead vapor product as a function of the number of separation stages calculated by means of computer modeling for a process in which benzene is separated from n-octane.

The benzene content of the overhead and bottoms products from the dephlegmator as a function of the number of stages is shown graphically in FIG. 14.

As would be expected, the more theoretical stages are available, the better is the separation.

Example 30
Methanol Azeotrope Separation

A computer calculation was performed with a modeling program, ChemCad V (ChemStations, Inc., Houston, Tex.), to illustrate the performance of an integrated membrane-dephlegmator process for separating an azeotropic mixture of 30wt % ethyl acetate/70 wt % methanol from a reaction process.

Figure 7:
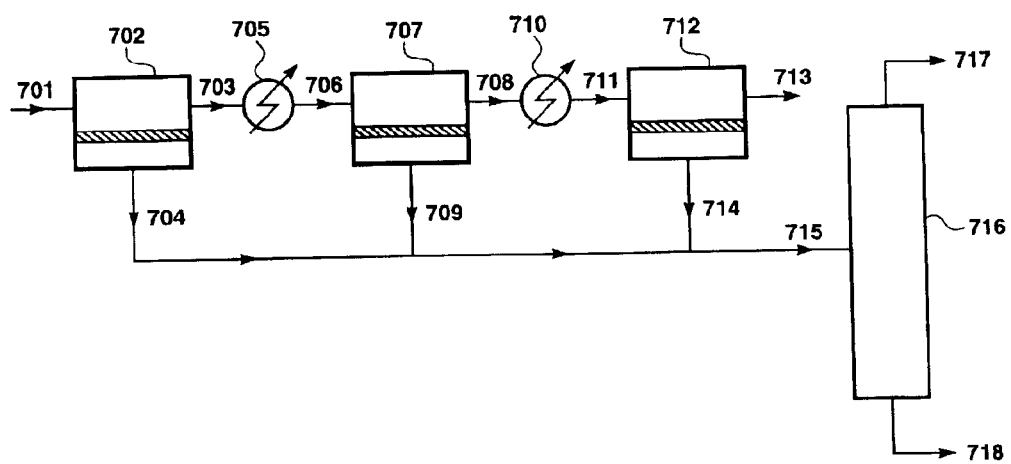
FIG. 7 is a schematic drawing showing an embodiment of the invention in which the pervaporation step is carried out in three sub-steps, with reheating of the liquid stream between each step.

The feed flow rate to the first membrane step was assumed to be 1,000 kg/h at an applied feed pressure of 100 psia and a feed temperature of 100° C. Since cooling of the feed liquid takes place as the components vaporize across the membrane, the pervaporation step was assumed to be carried out in three methanol-selective sub-steps, with the feed liquid being reheated to 100° C. between each step, according to the general scheme of FIG. 7.

In this figure, feed stream 701 passes into first membrane separation unit 702. Methanol-enriched permeate is withdrawn as stream 704; the methanol-depleted residue is withdrawn as stream 703. The residue stream is reheated in heater 705 and emerges as heated feed stream 706 to the second membrane separation unit, 707.

A second methanol-enriched permeate stream is withdrawn as stream 709, and a second methanol-depleted residue stream is withdrawn as stream 708. The second residue is reheated in heater 710 and emerges as heated feed stream 711 to the third membrane separation unit, 712.

Third methanol-depleted residue stream 713 is withdrawn.

The permeates from each step were assumed to be combined before being passed to the dephlegmator unit. Thus, third methanol-enriched permeate stream 714 is combined with permeate streams 704 and 709 to form feed stream 715, to the dephlegmator, unit 716.

The dephlegmator produces the desired methanol product as bottoms stream, 718, and an overhead stream, 717.

The membrane steps were assumed to be equipped with polyvinyl alcohol membranes providing a selectivity of 10 in favor of methanol over ethyl acetate, and the permeate side of each membrane sub-step was assumed to be maintained at 5 psia.

The results of the calculation are shown in Table 27. The stream numbers refer to FIG. 7.

TABLE 27

| | Stream | | | | | | | | | |
|---|---|---|---|---|---|---|---|---|---|---|
| | 701 | 703 | 704 | 708 | 709 | 713 | 714 | 715 | 717 | 718 |
| Mass flow (kg/h) | 1,000 | 878 | 122 | 768 | 110 | 674 | 94 | 326 | 61 | 265 |
| Temp. (° C.) | 100 | 46 | 75 | 47 | 75 | 48 | 76 | 75 | 38 | 39 |
| Pressure (psia) | 100 | 100 | 5 | 100 | 5 | 100 | 5 | 5 | 5 | 5 |
| Component (wt %): | | | | | | | | | | |
| Methanol | 70.0 | 66.0 | 98.9 | 62.5 | 90.1 | 58.8 | 89.3 | 93.2 | 79.6 | 96.3 |
| Ethyl Acetate | 30.0 | 34.0 | 1.1 | 37.5 | 9.9 | 41.2 | 10.7 | 6.8 | 20.4 | 3.7 |

Membrane area = 87 m$^2$ (45 + 36 + 6)

As can be seen, the pervaporation step produces a residue stream (stream 713) containing 41 wt % ethyl acetate. In a real process, this residue stream could be sent to a distillation column, following the type of scheme shown in FIG. 4, to yield a purified ethyl acetate product corresponding to stream 410.

The dephlegmator produces a 96 wt % methanol bottoms condensate product stream (stream 718) and an overhead stream (stream 717) containing 20 wt % ethyl acetate/80 wt % methanol. In a real process, this stream could be condensed and returned to the pervaporation feed for reprocessing to increase methanol recovery.

Example 31
Aromatic/Aliphatic Separation

A computer calculation was performed to illustrate the performance of an integrated membrane-dephlegmator process for separating an aromatic/aliphatic mixture using a process configuration as in FIG. 1.

The feed to the membrane system was assumed to be a liquid mixture of 80 wt % n-decane/20 wt % p-xylene at a feed flow rate of 1,000 kg/h, an applied feed pressure of 20 psia and a feed temperature of 120° C. The permeate side of the membrane was assumed to be maintained at 0.5 psia.

The membrane step was assumed to be equipped with polyurea-urethane block copolymer membranes that provide a selectivity of 5 in favor of p-xylene over n-decane.

The results of the calculation are shown in Table 28. The stream numbers refer to FIG. 1.

TABLE 28

| | Stream | | | | |
|---|---|---|---|---|---|
| | 101 | 103 | 104 | 109 | 108 |
| Mass flow (kg/h) | 1,000 | 828 | 172 | 91 | 81 |
| Temp. (° C.) | 120 | 94 | 107 | 46 | 55 |
| Pressure (psia) | 20 | 20 | 0.5 | 0.5 | 0.5 |
| Component (wt %): | | | | | |
| n-Decane | 80.0 | 90.4 | 29.9 | 2.5 | 60.6 |
| p-Xylene | 20.0 | 9.6 | 70.1 | 97.5 | 39.4 |

Membrane area = 71 m$^2$

The permeate vapor (stream 104) at 0.5 psia contains 70 wt % p-xylene and is sent to the dephlegmator. The overall process yields a purified p-xylene product stream containing 97.5 wt % p-xylene as dephlegmator overhead vapor stream 109. The condensate stream (stream 108) from the dephlegmator contains about 40 wt % p-xylene and could be recycled back to the pervaporation unit.

Example 32
Aromatic/Aliphatic Separation

The calculation of Example 31 was repeated, this time assuming the feed stream to be in the vapor phase at 100 psia and 260° C. In this case, the process was assumed to be carried out using high-temperature-resistant ceramic zeolite ZSM membranes, again providing a selectivity of 5 in favor of p-xylene, in the membrane vapor separation step. The permeate side of the membrane was assumed to be maintained at a much higher permeate pressure of 10 psia.

The results of the calculation are shown in Table 29. The stream numbers refer to FIG. 1.

TABLE 29

| | Stream | | | | |
|---|---|---|---|---|---|
| | 101 | 103 | 104 | 109 | 108 |
| Mass flow (kg/h) | 1,000 | 824 | 176 | 80 | 96 |
| Temp. (° C.) | 260 | 263 | 261 | 127 | 138 |
| Pressure (psia) | 100 | 100 | 10 | 10 | 10 |
| Component (wt %): | | | | | |
| n-Decane | 80.0 | 89.0 | 37.7 | 7.0 | 63.4 |
| p-Xylene | 20.0 | 11.0 | 62.3 | 93.0 | 36.6 |

Membrane area = 30 m$^2$

As can be seen, in this case the permeate vapor (stream 104) contains 62 wt % p-xylene at 10 psia. The purified p-xylene product vapor stream from the dephlegmator (stream 109) contains 93 wt % xylene, compared with 97.5 wt % in the case where the membrane separation was performed in the liquid phase. However, a much higher permeate pressure can be used and the top of the dephlegmator is only cooled to 127° C., compared with 46° C. in the previous case.

Example 33

Isomer Separation

A computer calculation was performed to illustrate the performance of the integrated membrane-dephlegmator process for separating n-butane from iso-butane.

The feed to the membrane system was assumed to be a vapor mixture of 50 wt % n-butane/50 wt % i-butane at a feed flow rate of 1,000 kg/h, a feed pressure of 200 psia and a feed temperature of 200° C. The permeate side of the membrane was assumed to be maintained at a permeate pressure of 40 psia.

The membrane vapor separation step was assumed to be equipped with ceramic zeolite ZSM membranes. The results of the calculation are shown in Table 30. The stream numbers refer to FIG. 1.

TABLE 30

| | Stream | | | | |
|---|---|---|---|---|---|
| | 101 | 103 | 104 | 109 | 108 |
| Mass flow (kg/h) | 1,000 | 387 | 613 | 98 | 515 |
| Temp. (° C.) | 200 | 186 | 194 | 23 | 26 |
| Pressure (psia) | 200 | 200 | 40 | 40 | 40 |
| Component (wt %): | | | | | |
| n-Butane | 50.0 | 10.0 | 75.3 | 47.4 | 80.6 |
| i-Butane | 50.0 | 90.0 | 24.7 | 52.6 | 19.4 |

Membrane area = 3.5 m$^2$

The permeate (stream 104) contains 75 wt % n-butane at 40 psia and is sent to the dephlegmator. As can be seen, the dephlegmator produces a condensate product stream (stream 108) containing 81 wt % n-butane. The overhead stream from the dephlegmator (stream 109) contains 47 wt % n-butane/53 wt % i-butane and could be returned to the feed of the membrane separation step.

Example 34

Isomer Separation

The calculation of Example 33 was repeated, this time assuming the feed stream to be in the liquid phase at an applied pressure of 300 psia and 100° C. In this case, the process was assumed to be carried out using Hyflon polymeric membranes. The permeate side of the membrane was assumed to be maintained at atmospheric pressure (15 psia).

The results of the calculation are shown in Table 31. The stream numbers refer to FIG. 1.

TABLE 31

| | Stream | | | | |
|---|---|---|---|---|---|
| | 101 | 103 | 104 | 109 | 108 |
| Mass flow (kg/h) | 1,000 | 459 | 541 | 122 | 419 |
| Temp. (° C.) | 100 | 1 | 62 | −6 | −3 |
| Pressure (psia) | 300 | 300 | 15 | 15 | 15 |
| Component (wt %): | | | | | |
| n-Butane | 50.0 | 26.2 | 70.2 | 46.4 | 77.1 |
| i-Butane | 50.0 | 73.8 | 29.8 | 53.6 | 22.9 |

Membrane area = 30 m$^2$

In this case, the permeate vapor (stream 104) contains 70 wt % n-butane at 15 psia. After separation in the dephlegmator at 15 psia, the condensate bottoms product (stream 108) contains 77 wt % n-butane.

Example 35

Gasoline Additive Production

A computer calculation was performed to illustrate the performance of the integrated membrane-dephlegmator process for separating methanol from dimethyl ether, a separation representative of those that might be needed during production of gasoline additives.

The feed to the membrane system was assumed to be a vapor mixture of 5 wt % methanol and 95 wt % dimethyl ether, at a feed flow rate of 1,000 kg/h, a feed pressure of 200 psia and a feed temperature of 80° C.

The membrane vapor separation step was assumed to be equipped with polyvinyl alcohol or cellulose acetate membranes, and the permeate side of the membrane was assumed to be maintained at a pressure of 5 psia.

The results of the calculation are shown in Table 32. The stream numbers refer to FIG. 1.

TABLE 32

| | Stream | | | | |
|---|---|---|---|---|---|
| | 101 | 103 | 104 | 109 | 108 |
| Mass flow (kg/h) | 1,000 | 663 | 337 | 293 | 44 |
| Temp. (° C.) | 80 | 68 | 74 | −21 | 12 |
| Pressure (psia) | 200 | 200 | 5 | 5 | 5 |
| Component (wt %): | | | | | |
| Methanol | 5.0 | 0.5 | 13.8 | 1.5 | 93.7 |
| Dimethyl Ether | 95.0 | 99.5 | 86.2 | 98.5 | 6.3 |

Membrane area = 28 m$^2$

As can be seen, the permeate (stream 104) from the membrane pervaporation step contains 14 wt % methanol at 5 psia. This vapor is sent to the dephlegmator. The dephlegmator produces an overhead purified ether product vapor stream (stream 109) containing 98.5 wt % dimethyl ether. The condensate (stream 108) containing 6 wt % dimethyl ether could optionally be recycled to the feed of the pervaporation unit.

We claim:

1. A process for treating a mixture of two or more organic compounds, the process comprising:
   (a) performing a membrane separation step by:
   (i) providing a membrane having a feed side and a permeate side;

(ii) providing a driving force for transmembrane permeation;
(iii) passing the mixture as a feed fluid stream across the feed side;
(iii) withdrawing a residue fluid stream from the feed side;
(iv) withdrawing from the permeate side a permeate vapor stream enriched in at least one organic compound compared with the feed fluid stream;
(b) providing a dephlegmator having a coolant flow side and a gas stream flow side and adapted for partial condensation of a gas stream by providing countercurrent flow between the rising gas stream and a falling condensate stream;
(c) passing at least a portion of the permeate vapor stream into the dephlegmator as a feed gas stream;
(d) flowing a coolant across the coolant flow side in heat-exchanging relationship with the feed gas stream;
(e) withdrawing an overhead vapor stream from the dephlegmator;
(f) withdrawing a bottoms condensate stream from the dephlegmator.

2. The process of claim 1, wherein the feed fluid stream is in the liquid phase.

3. The process of claim 1, wherein the feed fluid stream is in the gas phase.

4. The process of claim 1, wherein the membrane separation step (a) is carried out as a pervaporation step.

5. The process of claim 1, wherein the membrane separation step (a) is carried out as a membrane distillation step.

6. The process of claim 1, wherein the membrane separation step (a) is carried out as a vapor separation step.

7. The process of claim 1, wherein the mixture comprises an azeotrope.

8. The process of claim 1, wherein the mixture comprises an aromatic compound and an aliphatic compound.

9. The process of claim 1, wherein the mixture comprises an organic compound selected from the group consisting of alcohols, aldehydes, ketones, ethers and esters.

10. The process of claim 1, wherein the mixture comprises multiple isomers of an organic compound.

11. The process of claim 1, wherein the mixture comprises a $C_{4-6}$ hydrocarbon.

12. The process of claim 1, wherein the mixture comprises an olefin and a paraffin.

13. The process of claim 1, wherein the mixture comprises a sulfur-containing compound.

14. The process of claim 1, wherein the mixture comprises a flavor compound.

15. The process of claim 1, wherein the mixture further comprises a minor amount of an inorganic component.

16. The process of claim 1, wherein the feed fluid stream is heated prior to passing across the feed side.

17. The process of claim 1, wherein the feed fluid stream is compressed prior to passing across the feed side.

18. The process of claim 1, wherein the membrane is a polymeric membrane.

19. The process of claim 1, wherein the membrane is an inorganic membrane.

20. The process of claim 1, wherein the dephlegmator is a shell-and-tube dephlegmator.

21. The process of claim 1, wherein the dephlegmator is a plate-fin dephlegmator.

22. The process of claim 1, wherein the dephlegmator includes at least a section containing structured packing.

23. The process of claim 1, wherein the coolant is water.

24. The process of claim 1, carried out to recover a desired organic compound and wherein the overhead vapor stream contains at least about 90 wt % of the desired organic compound.

25. The process of claim 1, carried out to recover a desired organic compound and wherein the bottoms condensate stream contains at least about 90 wt % of the desired organic compound.

26. The process of claim 1, carried out to recover a desired organic compound and wherein the residue fluid stream contains at least about 90 wt % of the desired organic compound.

27. The process of claim 1, further comprising drawing a partial vacuum on the permeate side by means of a vacuum pump.

28. The process of claim 1, wherein the driving force is provided without using a vacuum pump on the permeate side.

29. The process of claim 1, further comprising passing a sweep gas across the permeate side.

30. The process of claim 1, wherein the feed gas stream is at a higher pressure than the permeate vapor stream.

31. The process of claim 1, further comprising condensing the overhead vapor stream to form a liquid product.

32. The process of claim 1, further comprising subjecting the overhead vapor stream to additional purification by passing at least a portion of the overhead vapor stream to a further treatment step selected from the group consisting of pervaporation, dephlegmation, distillation, condensation, phase separation, evaporation, stripping, scrubbing, absorption and adsorption.

33. The process of claim 1, further comprising subjecting the overhead vapor stream to additional purification by distillation.

34. The process of claim 1, further comprising subjecting the overhead vapor stream to additional purification by pervaporation.

35. The process of claim 1, further comprising subjecting the overhead vapor stream to additional purification by dephlegmation.

36. The process of claim 1, further comprising recirculating at least a portion of the overhead vapor stream as additional feed fluid to step (a).

37. The process of claim 1, further comprising subjecting the bottoms condensate stream to additional purification by passing at least a portion of the bottoms condensate stream to a further treatment step selected from the group consisting of pervaporation, dephlegmation, distillation, phase separation, evaporation, stripping, scrubbing, absorption and adsorption.

38. The process of claim 1, further comprising subjecting the bottoms condensate stream to additional purification by distillation.

39. The process of claim 1, further comprising subjecting the bottoms condensate stream to additional purification by pervaporation.

40. The process of claim 1, further comprising recirculating at least a portion of the bottoms condensate stream as additional feed fluid to step (a).

41. The process of claim 1, further comprising subjecting the residue fluid stream to additional purification by passing at least a portion of the residue fluid stream to a further treatment step selected from the group consisting of pervaporation, dephlegmation, distillation, evaporation, condensation, phase separation, stripping, scrubbing, absorption and adsorption.

42. The process of claim 1, further comprising subjecting the residue fluid stream to additional purification by distillation.

43. The process of claim 1, further comprising subjecting the residue fluid stream to additional purification by pervaporation.

44. The process of claim 1, further comprising subjecting the residue fluid stream to additional purification by dephlegmation.

45. The process of claim 1, wherein the permeate vapor stream is enriched in the at least one organic compound by no more than about 10-fold compared with the feed fluid stream.

46. The process of claim 1, wherein the membrane separation step (a) is carried out in multiple sub-steps connected in such a way that a previous residue stream from a previous sub-step forms a next feed stream to a next sub-step and each sub-step results in a sub-step permeate vapor stream, and in which at least two of the sub-step permeate vapor streams are combined to form the permeate vapor stream.

47. The process of claim 46, wherein each next feed stream is heated prior to passing into each next sub-step.

* * * * *